(12) United States Patent
Wang

(10) Patent No.: US 6,243,182 B1
(45) Date of Patent: Jun. 5, 2001

(54) ATMOSPHERIC TURBULENCE RESISTANT OPEN-AIR OPTICAL COMMUNICATION SYSTEM

(75) Inventor: Ting-I Wang, Gaithersburg, MD (US)

(73) Assignee: Optical Scientific, Inc., Gaithersburg, MD (US)

( * ) Notice: Subject to any disclaimer, the term of this patent is extended or adjusted under 35 U.S.C. 154(b) by 0 days.

(21) Appl. No.: 09/115,222

(22) Filed: Jul. 13, 1998

(51) Int. Cl.$^7$ ............................. G04B 10/00; G04B 10/06
(52) U.S. Cl. ..................... 359/171; 359/152; 359/153; 359/194
(58) Field of Search ................... 359/152, 153, 359/161, 159, 193, 194, 171

(56) References Cited

U.S. PATENT DOCUMENTS

| | | | | |
|---|---|---|---|---|
| 4,330,870 | * | 5/1982 | Arends | 455/617 |
| 5,329,395 | * | 7/1994 | Endo et al. | 359/159 |
| 5,548,434 | * | 8/1996 | Shimonaka et al. | 359/161 |
| 5,610,748 | * | 3/1997 | Sakanaka et al. | 359/154 |

OTHER PUBLICATIONS

"An optical device for path–averaged measurements of $C^2$"; G.R. Ochs and W.D. Cartwright SPIE; vol. 277—Atmospheric Transmission (1981); pp. 2–5.

"Modified spectrum of atmospheric temperature fluctuations and its application to optical propagation"; R.J. Hill and S.F. Clifford; J. Opt. Soc. Am.; vol. 68, No. 7; Jul. 1978, pp. 892–889.

"Measurement of Atmospheric Turbulence Relevant to Optical Propagation"; R.S. Lawrence, G.R. Ochs, and S.F. Clifford; J. Opt. Soc. Am; vol. 60, No. 6.; Jun. 1970; pp. 826–830.

"A saturation–resistant optical scintillometer to measure $C^2$"; Ting–i Wang, G.R. Ochs, and S.F. Clifford, J. Opt. Soc. Am.; vol. 68, No. 3; Mar. 1978; pp. 334–338.

"Saturation of optical scintillation by strong turbulence*"; S.F. Clifford, G.R. Ochs, and R.S. Lawrence; J. Opt. Soc. of Am.; vol. 64, No. 2; Feb. 1974; pp. 148–154.

"Finite aperture optical scintillometer for profiling wind and $C^2$"; G.R. Ochs and Ting–i Wang; Applied Optics, vol. 17; vol. 17, No. 23; Dec. 1, 1978; pp. 3774–3778.

* cited by examiner

*Primary Examiner*—Leslie Pascal
*Assistant Examiner*—Dalzid Singh
(74) *Attorney, Agent, or Firm*—Charles H. Thomas

(57) ABSTRACT

An open-air optical communication system is provided which enhances accuracy and reliability of signal transmission by utilizing multiple optical receivers. Two or more receivers are positioned within the path of a collimated optical beam emitted by a remote transmitter. The receiving lenses are of equal size and are positioned apart in a plane perpendicular to the optical beam a distance at least as great as the receiving lens diameter. The receiving lenses thereby receive two or more signals through different optical paths. All of these signals are electronically combined to yield one composite received signal that is better than any one of the individual received signals. The system employs automated gain control circuitry to further eliminate any signal fluctuations caused by atmospheric phenomena such as turbulence, fog, smoke, dust, rain, snow, etc. By utilizing multiple receivers, degradation of the transmitted signal due to atmospheric turbulence induced optical scintillation is significantly reduced.

17 Claims, 11 Drawing Sheets

ATMOSPHERIC TURBULENCE RESISTANT OPEN-AIR OPTICAL COMMUNICATION SYSTEM

BACKGROUND OF THE INVENTION

1. Field of the Invention

The present invention relates to an open-air optical communication system that avoids signal degradation due to attenuation and scattering.

2. Description of the Prior Art

Open-air optical communication systems have been available for decades and cover the range from single RS-232 units operating at 1200 bps to high-speed ATM units capable of live video broadcasts. While all conventional optical communication systems operate with weather related constraints, continuing advances in bandwidth improvement, cost reductions, and the minimization of atmospheric affects have aided in bringing optical communication systems into the mainstream of communication products available to the telecommunications engineer. Exemplary developments in this regard are reported in the following recent technical papers: T. Wang, G. R. Ochs, and S. F. Clifford, A Saturation-resistant Optical Scintillometer to Measure $C_n^2$, *J. Opt. Soc. Am.* 68, 334 (1978); S. F. Clifford, G. R. Ochs, and R. S. Lawrence, "Saturation of Optical Scintillation by Strong Turbulence", *J. Opt. Soc. Am.* 64, 148 (1974); R. S. Lawrence, G. R. Ochs, and S. F. Clifford, "Measurements of Atmospheric Turbulence Relevant to Optical Propagation", *J. Opt. Soc. Am.* 60, 826 (1970); G. R. Ochs, and Ting-I. Wang, "Finite Aperture Optical Scintillometer for Profiling Wind and $C_n^2$", *Appl. Opt.*, vol. 17, No. 23, 3774–3778 (1978); R. M. Gagliardi and S. Karp, *Optical Communications,* John Wiley & Sons, Inc., New York, 1995; C. P. Primmerman, et. al., "Atmospheric-Compensation Experiments in Strong-Scintillation Conditions", *Applied Optics* 34, No. 12, p. 2081–2088, 1995; and J. H. Shapiro, "Imaging and Optical Communications Through Atmospheric Turbulence", *Laser Beam Propagation in the Atmosphere,* J. W. Strohbehn, Ed., Springer-Verlag, New York, p.171–222, 1978.

Despite significant advances in the field of open-air optical communication, the development of such systems has been hampered by certain basic, underlying effects upon open-air optical communication systems that are unique to this type of communication. Specifically, the atmospheric optical channel may be seen as clear air, or it may contain particles from dust, fog, mist, or precipitation. When a light beam passes through the atmosphere containing fog, rain, or other particles, both attenuation and scattering occur. A collimated beam broadens due to the scattering, thus resulting in losses in signal strength. During heavy fog or snow, the light beam is totally obscured. Under such conditions no light can be transmitted to the other end of the communication system so that the open-air communication channel is interrupted. Essentially, there is no simple solution to overcome the basic limitations imposed by the laws of physics.

However, even in clean air conditions, atmospheric turbulence-induced optical scintillation may severely affect the quality of optical communications systems. Atmospheric turbulence induced optical scintillation is particularly important to understand when designing wireless communication solutions using an optical device. The shimmering eddies seen above a hot surface and the twinkling of stars are examples of turbulence induced optical scintillation. Temperature gradients within and between these eddies cause refractive index changes on the light as it passes from a transmitter to a receiver through these eddies. These changes act as additional optical lenses that orient and refocus the optical beam. Most of the light intensity fluxuation that occurs is a result of the refraction of the beam of light. That is, it results from scattering rather than attenuation.

SUMMARY OF THE INVENTION

Despite certain basic limitations, open-air optical communication systems do have some very significant advantages. Specifically they do not require any buried or overhead cable systems, which are extremely expensive to construct and which present considerable maintenance difficulties. Also, open-air optical communication systems are relatively insensitive to electrical disturbances from sources such as lightning, transmission in proximity to power lines, and fluxuations in solar radiation. Moreover, the components employed in open-air optical communication systems are typically quite reliable. Therefore, open-air optical communication systems do present considerable advantages, particularly if the problems arising from optical scintillation can be solved.

The present invention provides one of the most important and cost effective solutions to the minimization or even elimination of optical scintillation problems. This invention largely obviates the problem of optical scintillation by utilizing a "multiple optical receiver" design. A system constructed according to the invention integrates two or more receivers to overcome fading or scattering conditions that may be caused by optical scintillation or beam wandering induced by atmospheric turbulence. The multiple receiver design actually receives two or more signals through different optical paths from the same optical transmitter. All of these signals are combined to yield one composite received signal that is better than any of the individual signals.

For the open-air optical communication system of the present invention to be most effective, each optical receiving lens employed in the receiving unit should be spaced from any other receiving lens in that unit by a distance at least equal to the diameter of the lens in a plane oriented perpendicular to the collimated optical beam received. This configuration ensures that all received signals are subject to independent scintillating effects. By processing signals that are not subject to the same scintillating effect, significantly improved performance is achieved. Also, an automated gain control (AGC) circuitry is employed to further eliminate any signal fluxuations caused by atmospheric phenomena such a turbulence, fog, smoke, dust, rain, snow, etc.

For a total of n channels there are a corresponding number of independently received, incoming optical signals. That is, for n channels the system produces the following corresponding signals: $S_1, S_2 \ldots S_n$.

In the automatic gain control circuitry, these signals are combined. That is, the combined signal S results from combining all of the received signals together ($S=S_1+S_2+\ldots S_n$).

In any open-air optical communication system, there must be a minimum detection threshold for a signal in order for the system to have a satisfactory performance. This minimum threshold may be indicated by the term $S_{th}$. For any signal $S_i$ (i=1, 2, ... n)<$S_{th}$ the system will fail.

If the probability that each signal $S_i<S_{th}$ is p, then the probability for the combined signal $S<S_{th}$ is $p^n$.

This mathematical relationship provides a huge advantage for the combined signal to have a satisfactory performance. For example, if for each individual channel the failing probability $p=10^{-3}$, a single channel system will not provide a satisfactory performance one out of a thousand times. Using a dual receiver system according to the present invention, on the other hand, the probability of failure is reduced to $10^{-6}$. That is, the system will fail only one time in a million. The improvement is a factor of one thousand. If more than a pair of receiving lenses and photodetectors are employed, the improvement is even more significant.

In the foregoing calculations it is assumed that all received signals are passing through independent paths. To ensure this independence of the atmospheric turbulence induced optical scintillations, the separation of the receiving lenses must be at least larger than the diameter of the lens.

In one broad aspect the present invention may be considered to be an atmospheric turbulence resistant optical communication system. This system is comprised of a transmitter and a receiver. The transmitter includes a waveform shaping modulator, an optical source, and beam forming optics for producing a collimated optical beam. A laser diode is an excellent choice as the optical source of an open-air optical communication system for its ease of light collimation and modulation. The receiver is located in a line-of-sight path with the optical beam and includes a plural number of focusing receiving lenses of equal diameter spaced apart in a plane normal to the optical beam a distance greater than the receiving lens diameter. The receiver also includes a separate photodetector for each of the receiving lenses, as well as separate, signal controlled gain amplifiers for each of the photodetectors. The receiver further employs an automatic gain control circuit coupled to receive and combine inputs from all of the signal controlled gain amplifiers and conditioned to provide a combined output signal of constant level.

In another broad aspect the invention may be considered to be an open-air optical communication system that minimizes distortion due to atmospheric attenuation and scattering. The optical communication system of the invention is comprised of an optical transmitter that generates a collimated optical beam from a modulated light source. It also includes an optical receiver including a plurality of receiving lenses of equal diameter and equal focal lengths all located in optical communication with the optical transmitter and in the path of the optical beam. These lenses are separated from each other in a direction perpendicular to the optical beam by a distance at least as great as the receiving lens diameter. The receiver includes a separate optical photodetector producing an electronic output for each of the receiving lenses. A separate signal controlled gain amplifier circuit is coupled to each of the optical photodetectors for detecting the signal-to-noise ratio of electronic output therefrom. An automated gain control stage receives inputs from all of the signal controlled gain amplifier circuits. The automated gain control stage produces a combined electronic output signal weighted in accordance with the signal-to-noise ratios of the signal controlled gain amplifier circuits.

In still another broad aspect the invention may be considered to be an improvement of an open-air optical communication system employing a transmitter that generates a collimated optical beam modulated by a communication signal and a receiver disposed in the optical path of the collimated optical signal beam to detect and to modulate the collimated optical beam to extract the communication signal therefrom. According to the improvement of the invention the receiver is comprised of a plurality of receiving lenses of equal diameter. All of these lenses lie in the optical path of the collimated optical beam and are separated from each other in a plane normal to the optical path by a distance at least as great as the receiving lens diameter. A separate photodetector for each of the receiving lenses is provided to independently detect the collimated optical beam therethrough. Separate gain amplifiers are provided for each of the photodetectors. A common, automated gain control circuit is coupled to receive inputs from all of the separate gain amplifiers and to combine the inputs to produce a single demodulated output communication signal having a constant level.

The optical communication system of the invention provides a transparent communication solution for short distance DS-1 and E1 applications. The unique technology designed into this system integrates optical transceivers into a wireless transmission media that yields a very cost effective solution for line-of-sight distances up to one kilometer. The system also provides license-free operation and is quite transportable, since each transceiver weighs only 1.5 kilograms. The system provides a high fade margin, dual receive architecture, and plug-and-play installation. The fade margin is twenty decibels.

The optical communication system of the present invention may be used with private networks, competitive access providers, and local exchange networks. Its uses include teleconferencing, voice, data, and video communications. It may be utilized for primary and redundant links. It may also be employed as a last mile connection and in surveillance monitoring. The optical communication system of the invention may be used as a temporary communication system, since it is capable of rapid deployment. This makes it especially useful in disaster recovery circumstances.

The invention may be described with greater clarity and particularity by reference to the accompanying drawings.

DESCRIPTION OF THE DRAWINGS

FIG. 8a is a schematic diagram of the signal controlled gain amplifier for the photodetector and preamplifier of FIG. 7a.

DESCRIPTION OF THE EMBODIMENT

Figure 1:
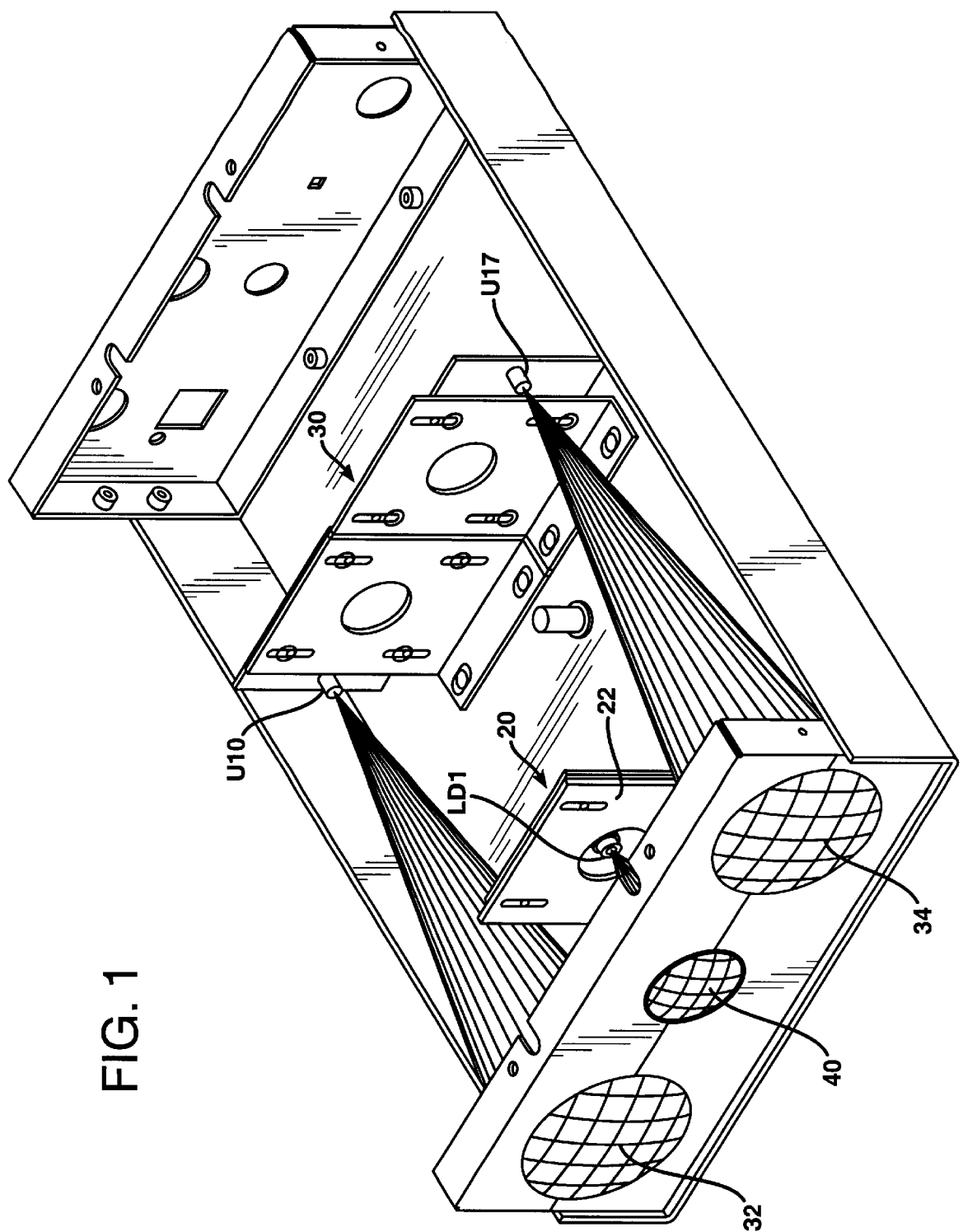
FIG. 1 is a perspective view of one transceiver in a full duplex open-air optical communication system constructed according to the invention. The transceiver of FIG. 1 is shown without its protective cover to permit the internal components thereof to be more clearly illustrated.
Figure 2:
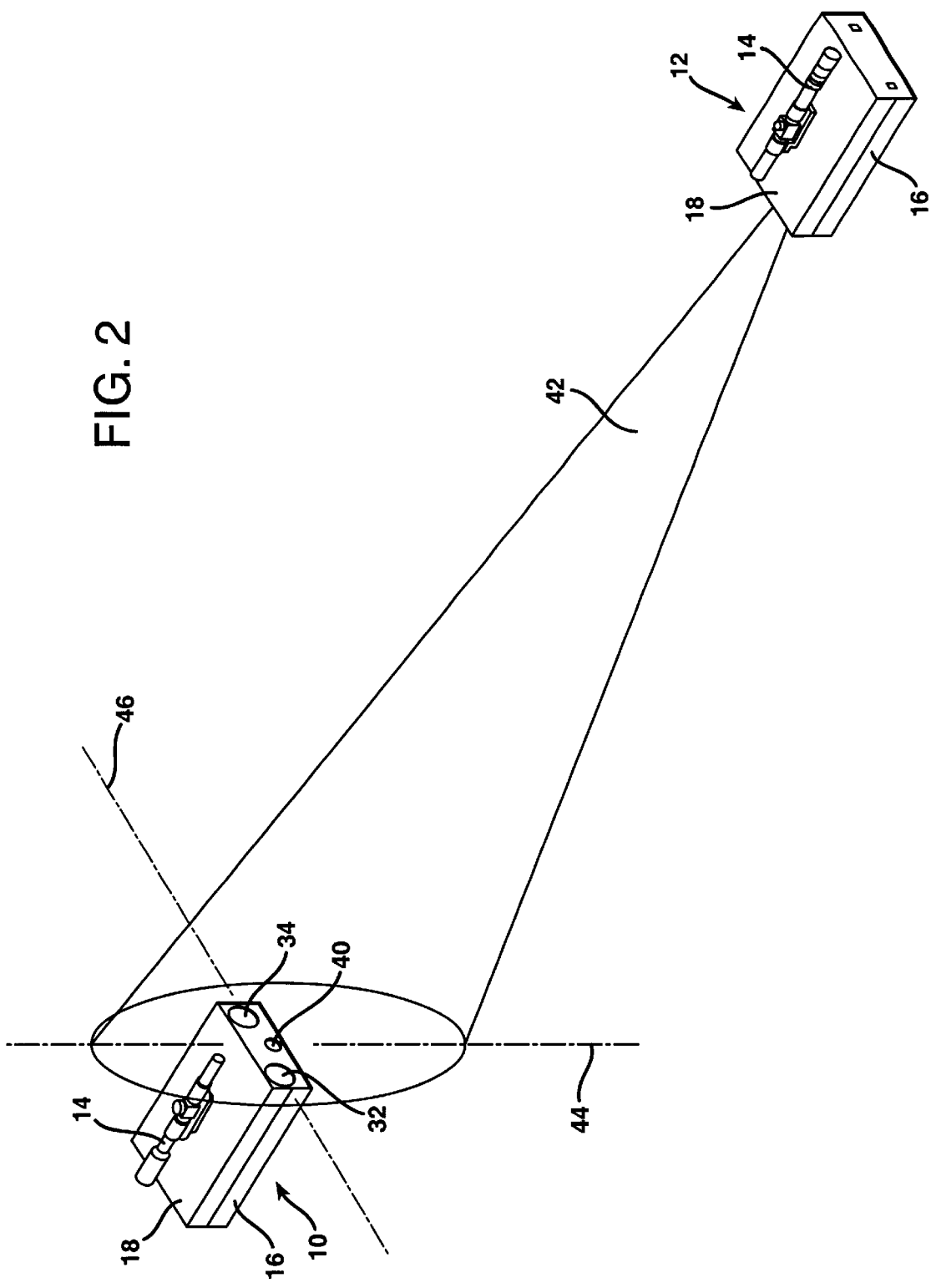
FIG. 2 is a perspective view illustrating an optical communication system according to the invention which employs a pair of atmospheric turbulence resistant open-air optical communication transceivers according to FIG. 1.

As illustrated in FIG. 2, a full duplex open-air optical communication system according to the invention may be constructed utilizing a pair of optical transceiver units 10 and 12. The transceivers 10 and 12 are identical in all respects and are positioned in optical combination to transmit and receive signals to and from each other. The electronic and optical components of the transceivers 10 and 12 are each housed within a weather-resistant case 16 having a cover 18 seated thereon in a weather-tight fashion. FIG. 1 illustrates one of the optical transceivers 10 or 12 with the cover 18 removed therefrom.

The physical dimensions of the case 16 of each of the transceivers 10 and 12 is one hundred millimeters in height, one hundred eighty millimeters in width, and two hundred ninety millimeters in depth. The system employs a 12-volt DC nominal power supply and may be operated between 0° C. to 50° C. Each of the transceivers 10 and 12 weighs 1.5 kg.

As illustrated in FIG. 1, each transceiver 10 and 12 is provided with a transmitter, indicated generally at 20. The transmitter 20 is a laser-type GaAlAs having a laser wavelength of 780–940 nanometers. The beam divergence is 0.5 to five mrad with an average power of five to forty milliwatts. The optical aperture is twenty-five millimeters. The electronic components of the transmitter 20 are mounted upon a printed circuit board 22. The transmitter 20 includes a waveform shaping modulator 24, an optical source which is preferably a laser diode LD1, and laser diode driver circuitry indicated generally at 28 in FIG. 3. The beam forming optics of the transmitter 20 include a convex, one-inch diameter beam forming transmitting lens 40. The collimating lens 40 is focused on the laser diode LD1 and produces a collimated optical beam indicated generally at 42 in FIGS. 2 and 3.

The transceivers 10 and 12 are each designed with a dual optical receiver 30 that enhances system performance. This dual receiver system provides both data redundancy and path diversity to minimize the effects of turbulence. Both of the signals received by the receiver 30 are compared with each other and the best signal is weighted in the combined output to ensure optimal performance.

Installing and aligning the transceivers 10 and 12 is quite simple. All that is required is to mount the transceivers, align them, and connect them to a power source and a DSX-1 or E1 source. The only special tool needed is a visual alignment scope 14 which is included with each of the transceivers 10 and 12.

The optical transmitters 20 of the transceivers 10 and 12 are identical to each other. Only one transmitter 20 is illustrated diagrammatically in FIG. 3 and schematically in FIG. 5. Each optical transmitter 20 is formed of three elements, namely the waveform shaping modulating circuit 24, the optical source, which is the laser diode LD1 and its laser diode driver circuitry 28, and beam forming optics, namely the convex transmitting lens 40.

Optical communication systems require a light source that can be easily modulated. Open-air optical communication systems must have a means to inject information signals, that is data, on the light source to project it to a distant receiver. Focusing of the modulated light is accomplished with beam forming optics. Ideally, the lens 40 collects light from a point source, namely the laser diode LD1, and expands it to a perfect parallel beam. In practice, however, the beam 42 expands during propagation to a size that is a function of the diameter of the transmitting lens 40, the focal length of the transmitting lens 40, and distance from the laser source LD1 to the lens 40. Typical divergence for optical communication systems are on the order of several milliradians.

In FIG. 2 the transceiver 12 is illustrated as being operated in the transmitting mode to produce the collimated optical beam 42, and the transceiver 10 is illustrated as being operated in the receiving mode. As shown in that drawing figure, the single transmitting lens 40 of the transceiver 12 emits a collimated beam 42 that has an elliptical cross section with a vertically oriented major axis indicated at 44.

In the embodiment depicted, each of the transceivers 10 and 12 is equipped with a receiver 30 that employs only a pair of receiver lenses 32 and 34 of equal size, preferably about two inches in diameter. As illustrated in FIG. 2, the receiver 30 of the transceiver 10 is located in a line-of-sight path with the optical beam 42. The focusing receiving lenses 32 and 34 are spaced apart in a horizontal direction along the minor, horizontal axis 46 of the collimated beam 42, in a plane normal or perpendicular to the optical beam 42.

Each lens 32 and 34 is provided with a separate photodetector which is preferably a direct detection or noncoherent receiver such as a pin photodetector. Preferably each receiver 30 employs two silicon pin photodiodes U10 and U17 having a field of view of three to fifteen mrads and an optical aperture of fifty-four mm. The lenses 32 and 34 focus the received beam 42 onto their photodetectors U10 and U17, respectively. The receiving lenses 32 and 34 are spaced apart from each other a distance greater than their diameter along the horizontal, minor axis 46 of the elliptical cross section of the collimated beam 42. As illustrated diagrammatically in FIG. 4, separate signal controlled gain amplifiers 36 and 38 are provided for the photodetectors U10 and U17.

Each receiver 30 also includes an automatic gain control circuit 50 coupled to receive and combine inputs from all the signal controlled gain amplifiers 36 and 38. The automatic gain control circuit 50 is conditioned to provide a combined output signal of constant level derived from the electronic output signals of the photodetectors U10 and U17 responsive to their optical inputs from their respective receiving lenses 32 and 34. Preferably, the receiver 30 further includes optical filters 52 located in front of each of the receiving lenses 32 and 34 to reduce the effects of background radiation. These filters are indicated diagrammatically in FIG. 4.

Although the effects of scattering and attenuation may improve by increasing the number of receiving lenses, with each lens having its own photodetector and signal controlled gain amplifier, an increase in the number of lenses does increase the cost of the device. Therefore, in the embodiment illustrated only two receiving lenses 32 and 34 are employed. However, it is to be understood that any number of additional lenses with their dedicated photodetectors and signal controlled gain amplification circuits can be utilized in accordance with the invention.

Figure 4:
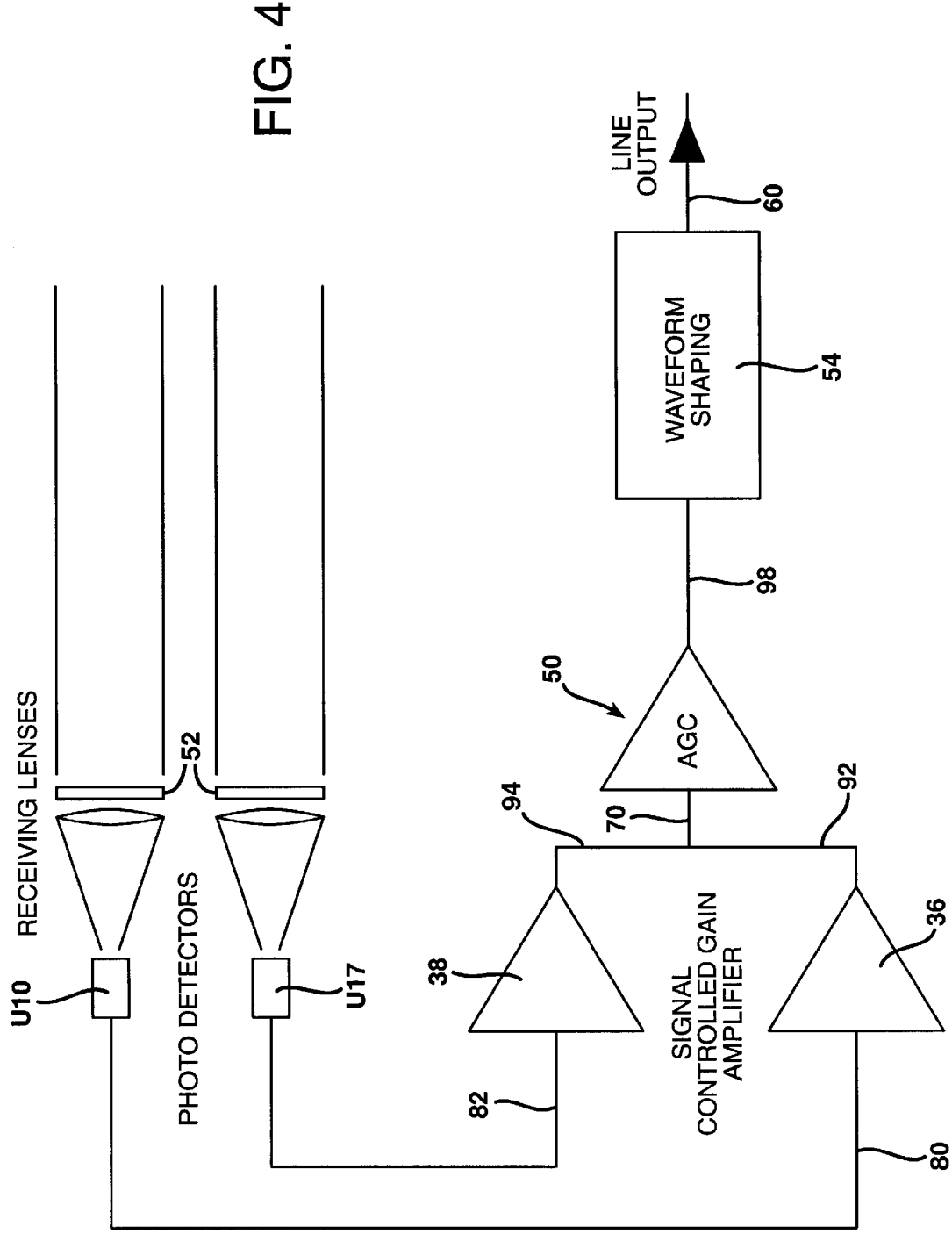
FIG. 4 is a block diagram of one of the optical receivers employed in the system of FIG. 2.

With reference to FIG. 4, the signal controlled gain amplifiers 36 and 38 detect the signal-to-noise ratio from their respective photodetectors U10 and U17. The automatic gain control circuit 50 provides the combined output with a contribution from each photodetector U10 or U17 weighted in accordance with its signal-to-noise ratio.

Figure 3:
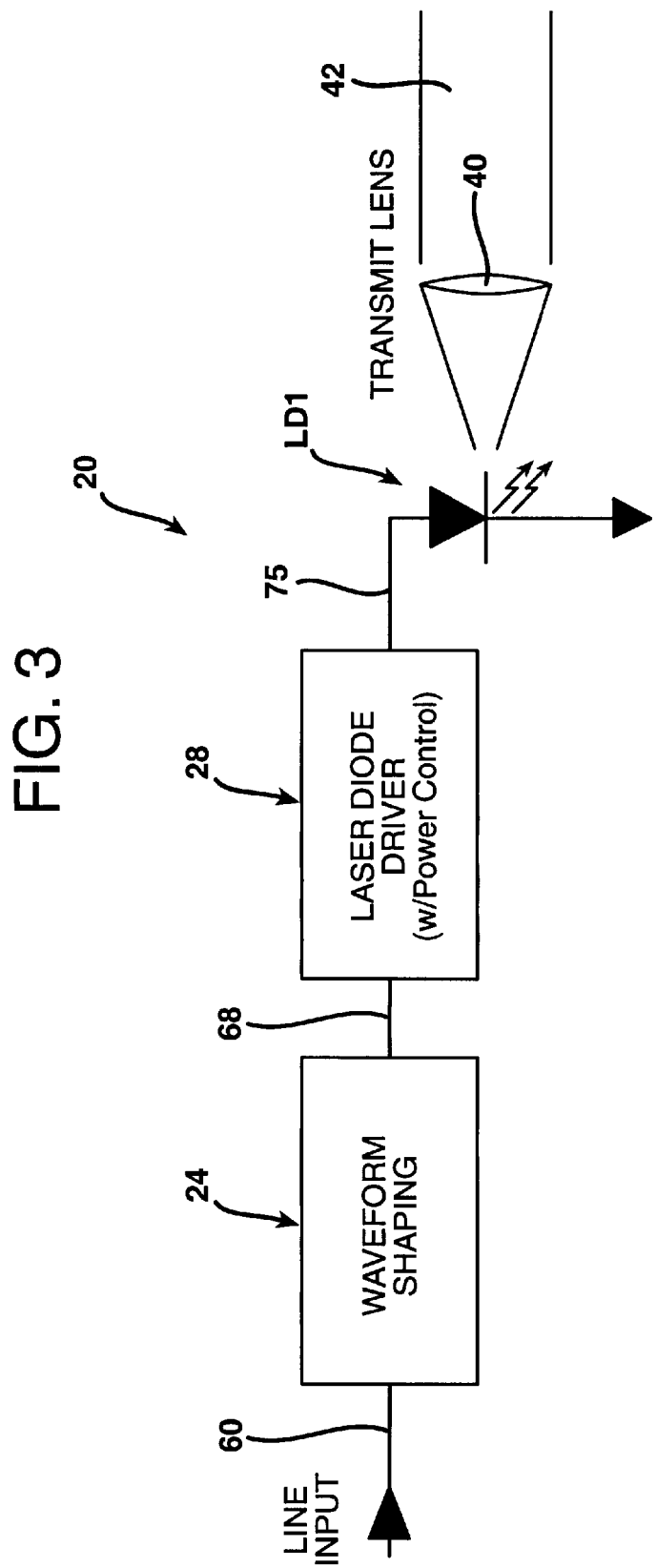
FIG. 3 is a block diagram of one of the optical transmitters employed in the system of FIG. 2.

As indicated in FIG. 3, the input signal waveform is shaped by a waveform shaping stage 24 to restore the waveform which may be deteriorated by the input line 60. The reshaped waveform then modulates a laser diode driver 28 with output power control to safely drive the laser diode LD1. The center, small lens 40 of each of the transceivers 10 and 12 is the transmitting collimator. The laser diode LD1 is placed at the focal point of the lens 40 to form a collimated beam projected to a distant receiver 30 in the other of the two transceivers 10 and 12 depicted in FIG. 2. The two larger lenses 32 and 34 focus different portions of the incoming beam 42 upon the separate photodetectors U10 and U17.

Figure 5:
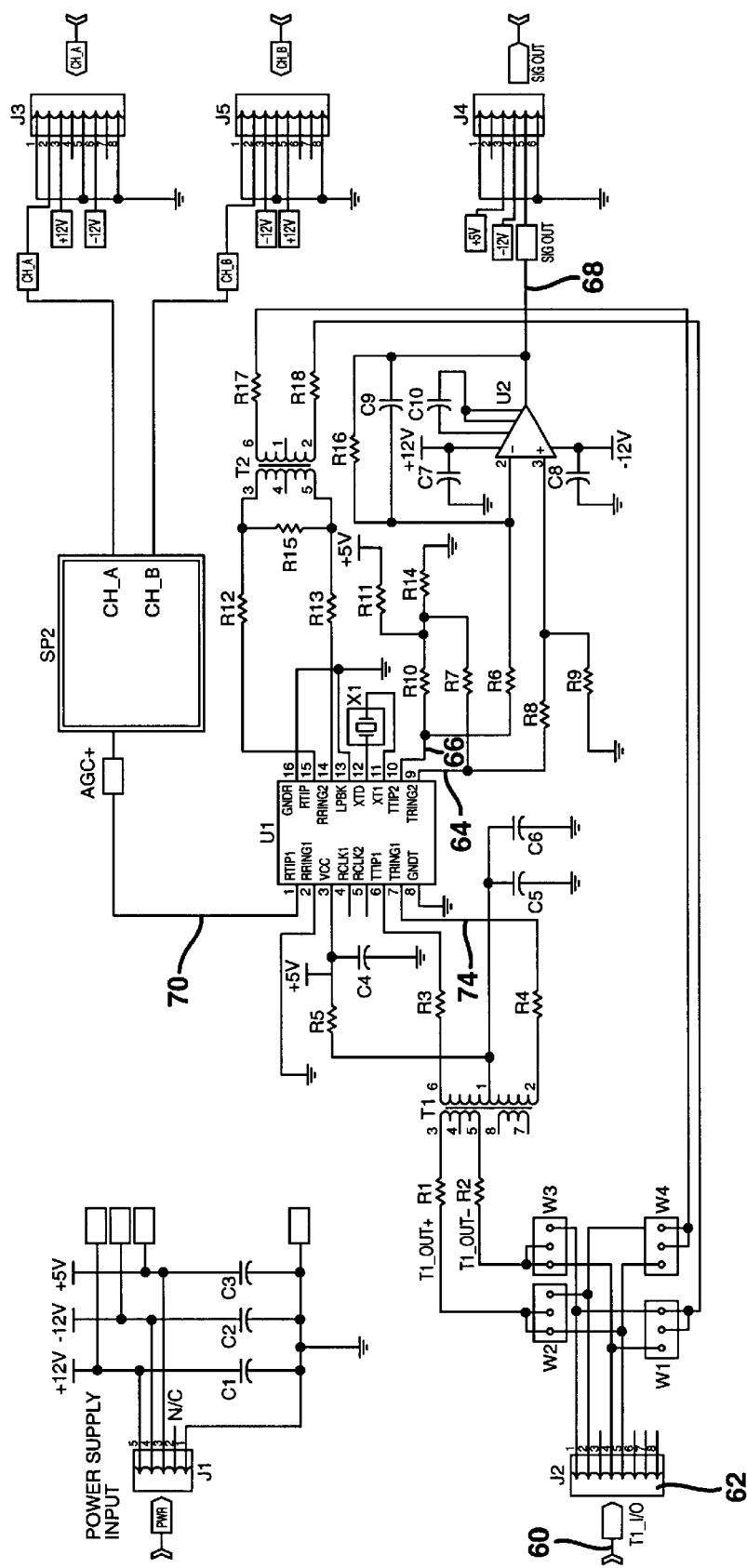
FIG. 5 is a schematic diagram of the waveform shaping circuitry employed in the transmitter depicted in FIG. 3.

A waveform shaping circuit 54 is also employed in demodulating the output of the automated gain control circuit 50 in the receiver 30. FIG. 5 depicts circuitry that includes both the transmitting waveform shaping circuit 24 and the receiving waveform shaping circuit 54. As illustrated in FIG. 5, the transmitter input line signal 60, which may have been deteriorated, passes from a jumper block 62 through a transformer T2 to pins 14 and 15 of an IC analog, T1 PCM Repeater/Transceiver chip U1. The reshaped waveform of the input signal on line 60 is provided as an output from the IC chip U1 through pins 9 and 10 on lines 64 and 66, respectively. This signal is then passed through a differential amplifier U2. From the output 68 of the differential amplifier U2 the signal is passed to the laser diode driver circuitry LD1, illustrated schematically in FIG. 6.

The other half of the T1 PCM Repeater/Transceiver chip U1 is used as the waveform shaping circuit 54 for the optical receiver 30. The received signal from the automatic gain control stage 50 is provided on line 70 as an input to pins 1 and 2 of chip U1. The reshaped waveform appears as an output on lines 72 and 74 at pins 6 and 7 of chip U1. The received signal then passes through output transformer T1 to the end user. When the transceivers 10 and 12 operate in the receive mode, the received signal output from the chip U1 also appears as a line output on line 60.

The optical communication system of the invention may be utilized for short distance DS-1 and E1 applications. For a DS-1 application, chip U1 is a model LXT312 and the crystal oscillator X1 generates a 6.176 MHz frequency signal. For E1 users the chip U1 is a model LXT313 and crystal oscillator X1 generates an 8.129 MHz frequency signal.

Figure 6:
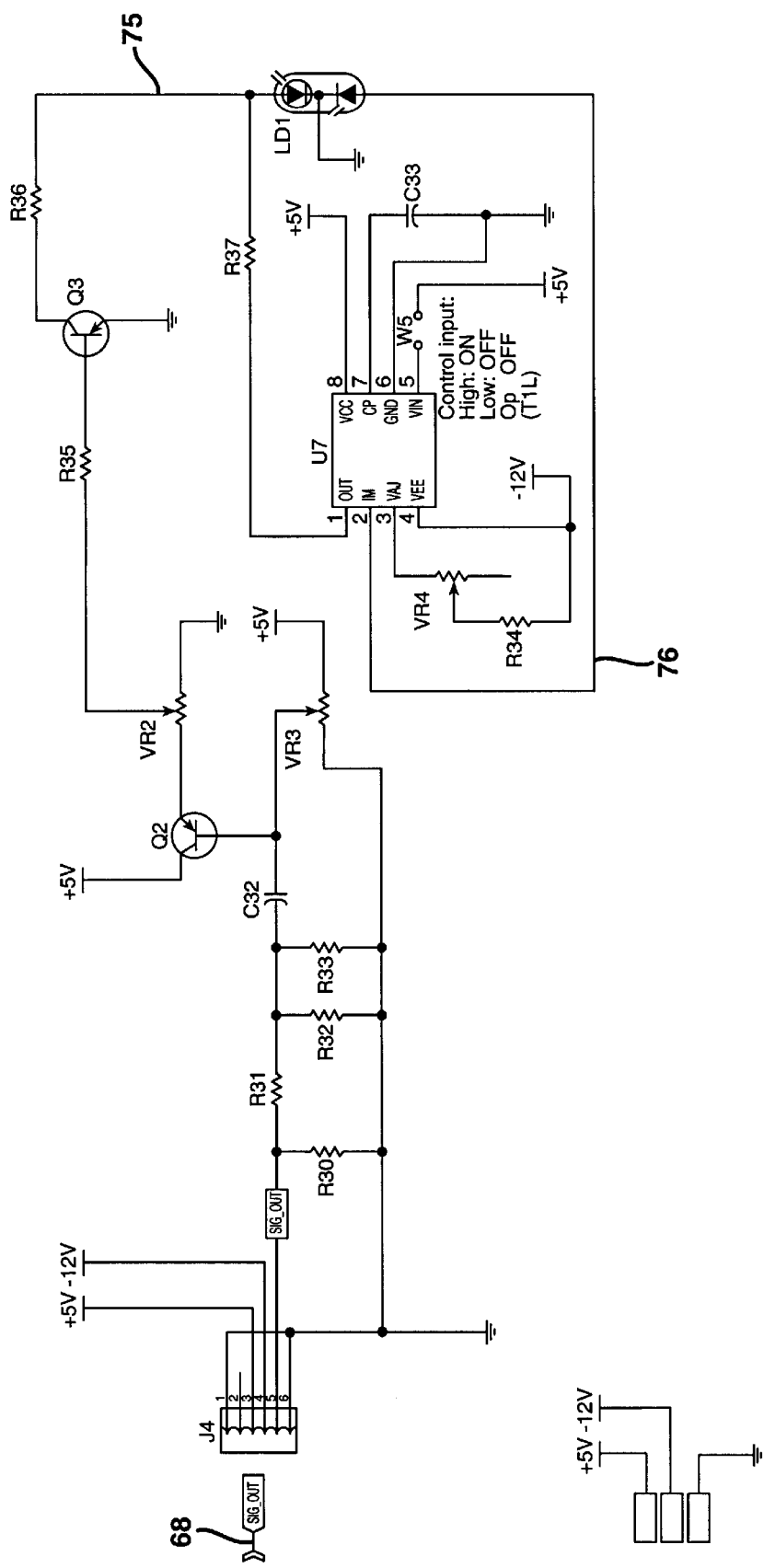
FIG. 6 is a schematic diagram of the laser diode driving circuit and the laser diode employed in the transmitter of FIG. 3.

The laser diode driver circuitry 28, indicated in FIG. 3, is illustrated schematically in FIG. 6. The reshaped signal from operational amplifier U2 in FIG. 5 that appears on line 68 is fed through transistors Q2 and Q3 in FIG. 6 to drive the laser diode LD1. Variable resisters VR2 and VR3 are used to adjust the DC bias of transistors Q2 and Q3 respectively. The output laser power is monitored and is fed on line 76 to pin 2 of the laser diode driver U7. Variable resister VR4 is used to adjust the laser output power to the design power.

Figure 7A:
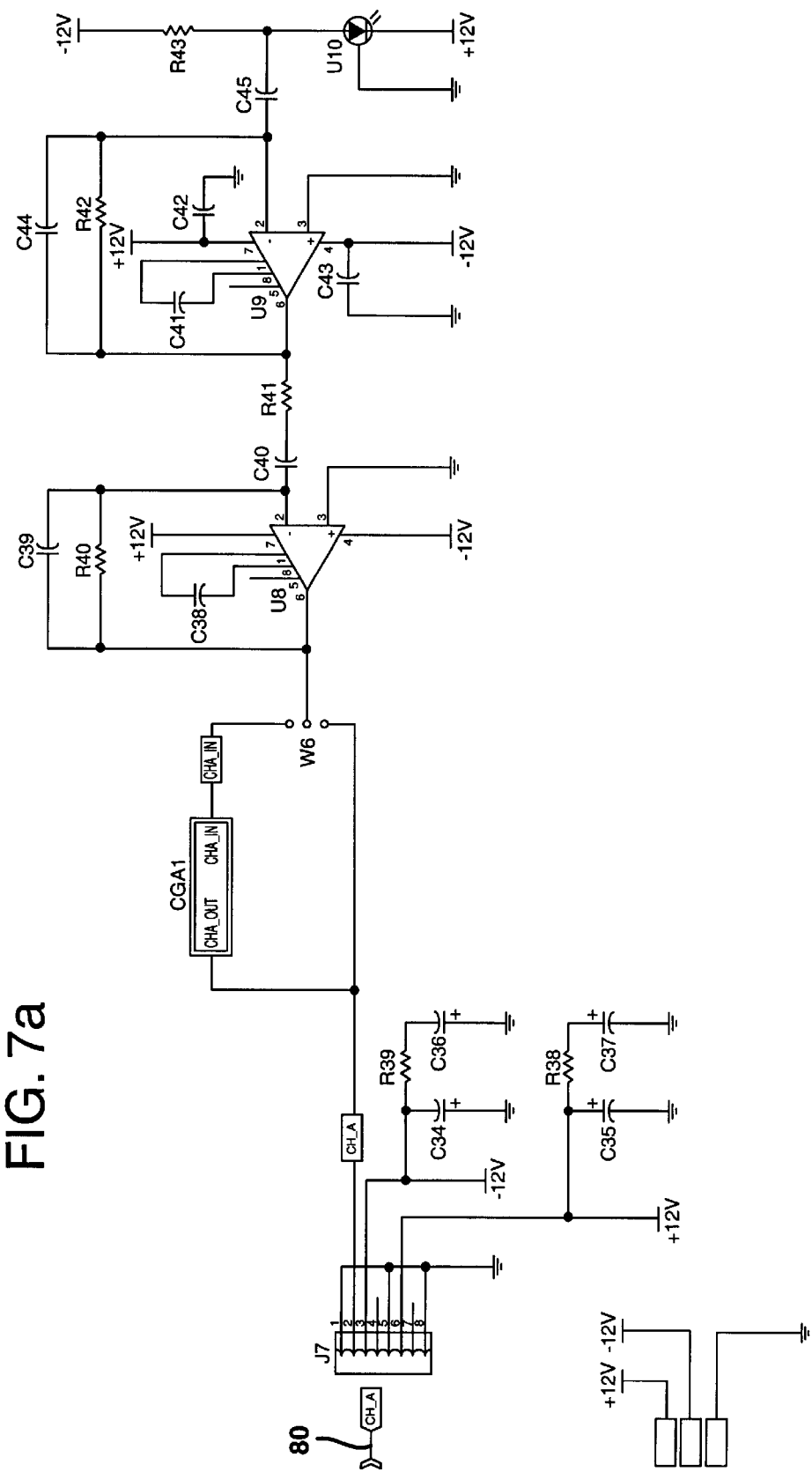
FIG. 7a is a schematic diagram of one of the photodetectors and its preamplification circuitry employed in the receiver of FIG. 4.
Figure 7B:
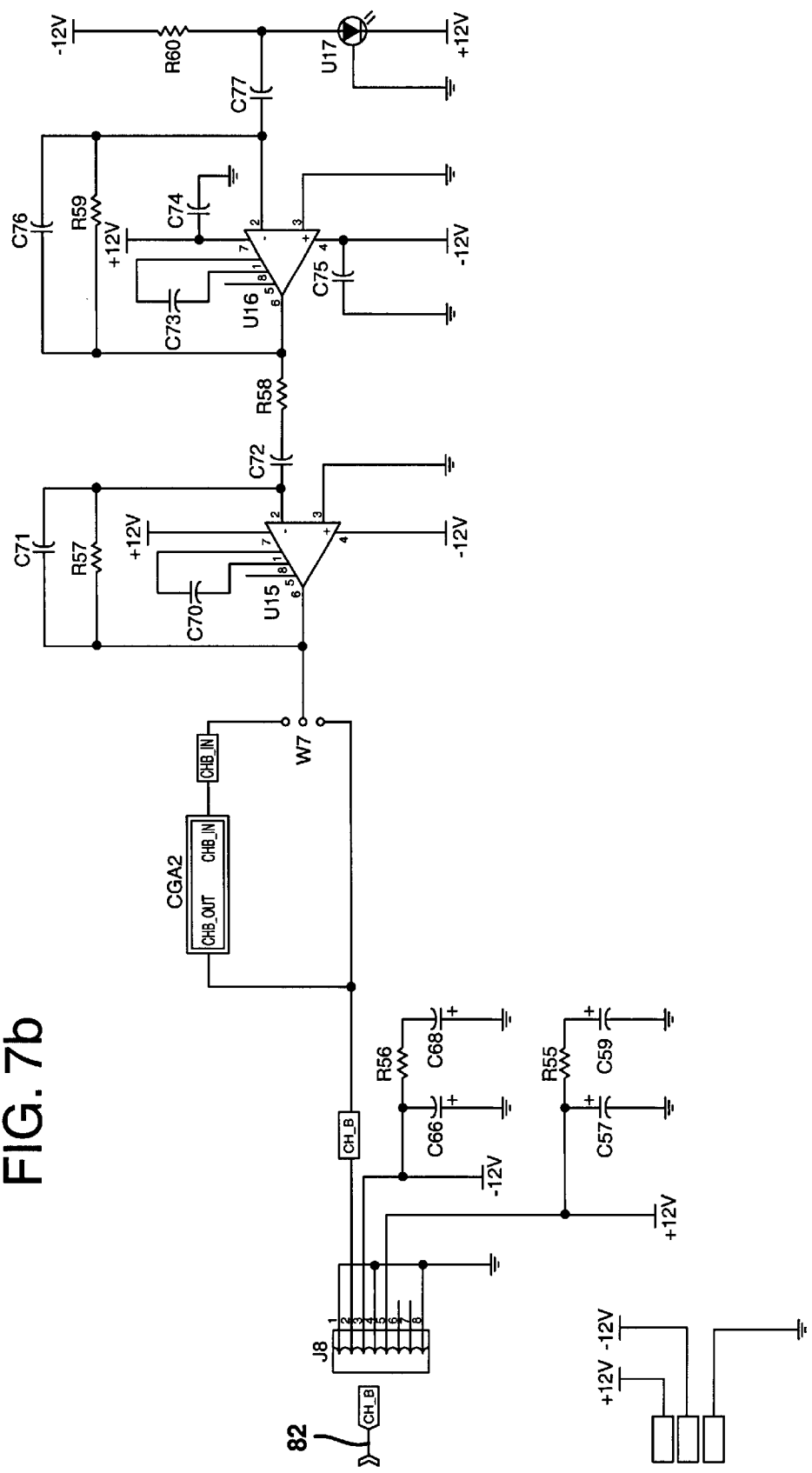
FIG. 7b is a schematic diagram of the other photodetector and its preamplification circuitry employed in the receiver of FIG. 4.

The photodetectors U10 and U17 are respectively positioned at the focal points of receiving lenses 32 and 34. The two optical signals from the receiving lenses 32 and 34 are detected, respectively, by the two photodetectors U10 in FIG. 7a and U17 in FIG. 7b. Each received signal is amplified by two amplifier stages. The operational amplifiers U8 and U9 in FIG. 7a amplify the signal from photodetector U10 detected by receiving lens 32. Similarly, the operational amplifiers U15 and U16 amplify the signal from photodetector U17 detected by receiving lens 34. Once the outputs of the photodetectors U10 and U17 have been preamplified, they are provided as outputs 80 and 82, respectively, corresponding to the two channels of the receiver 30 that are employed. The outputs 80 and 82 are fed to the signal controlled gain amplifiers 36 and 38 associated therewith. These amplifiers are schematically illustrated, respectively, in FIGS. 8a and 8b.

In the signal controlled gain amplifier 36 the signal on line 80 is first amplified by an amplification stage operational amplifier U11. Similarly, the signal on line 82 in the signal controlled gain amplifier 38 in FIG. 8b is amplified by an operational amplifier U18. The output signals 84 and 86 from operational amplifiers U11 and U18, respectively, are then passed through low-pass filters to amplifiers U12 and U19, respectively, to clean up noise on the signals.

The output signal level is also detected by two rectified stages in each of the signal controlled gain amplifiers 36 and 38. Specifically, operational amplifiers U13 and U14 in FIG. 8a detect the output signal level derived from the receiving lens 32, while operational amplifiers U20 and U21, shown in FIG. 8b, detect the signal level produced from the receiving lens 34. These measured signal levels appear at 88 and 90, respectively.

The measured signal levels 88 and 90 are used to control the impedance between the source and drain of an associated field-effect transistor (FET). The signal level on line 88 controls the impedance between the source and drain of field-effect transistor Q4 in FIG. 8a, while the signal level on line 90 controls the impedance between the source and drain of field-effect transistor Q5 in FIG. 8b. A stronger signal level on lines 88 and 90 will induce a smaller impedance of the FET to which it is connected to give a larger gain of its associated amplifier U11 in FIG. 8a and U18 in FIG. 8b. Therefore, a larger signal level will result in a larger gain at the channel output 92 in FIG. 8a and the channel output 94 in FIG. 8b. These signals are combined with each other as inputs into the automated gain control circuit 50, shown diagrammatically in FIG. 4, and illustrated schematically in FIG. 9.

By weighting the gain of the amplifiers U11 and U18 in accordance with the signal-to-noise ratio, the signal controlled gain amplifiers 36 and 38 amplify outputs from their respective photodetectors U10 and U17 with a gain that is proportional to the signal-to-noise ratio thereof. As a result, the combined output signal to the automated gain control circuit 50 is weighted greatest by the photodetector U10 or U17 having the greatest signal-to-noise ratio.

Figure 8A:
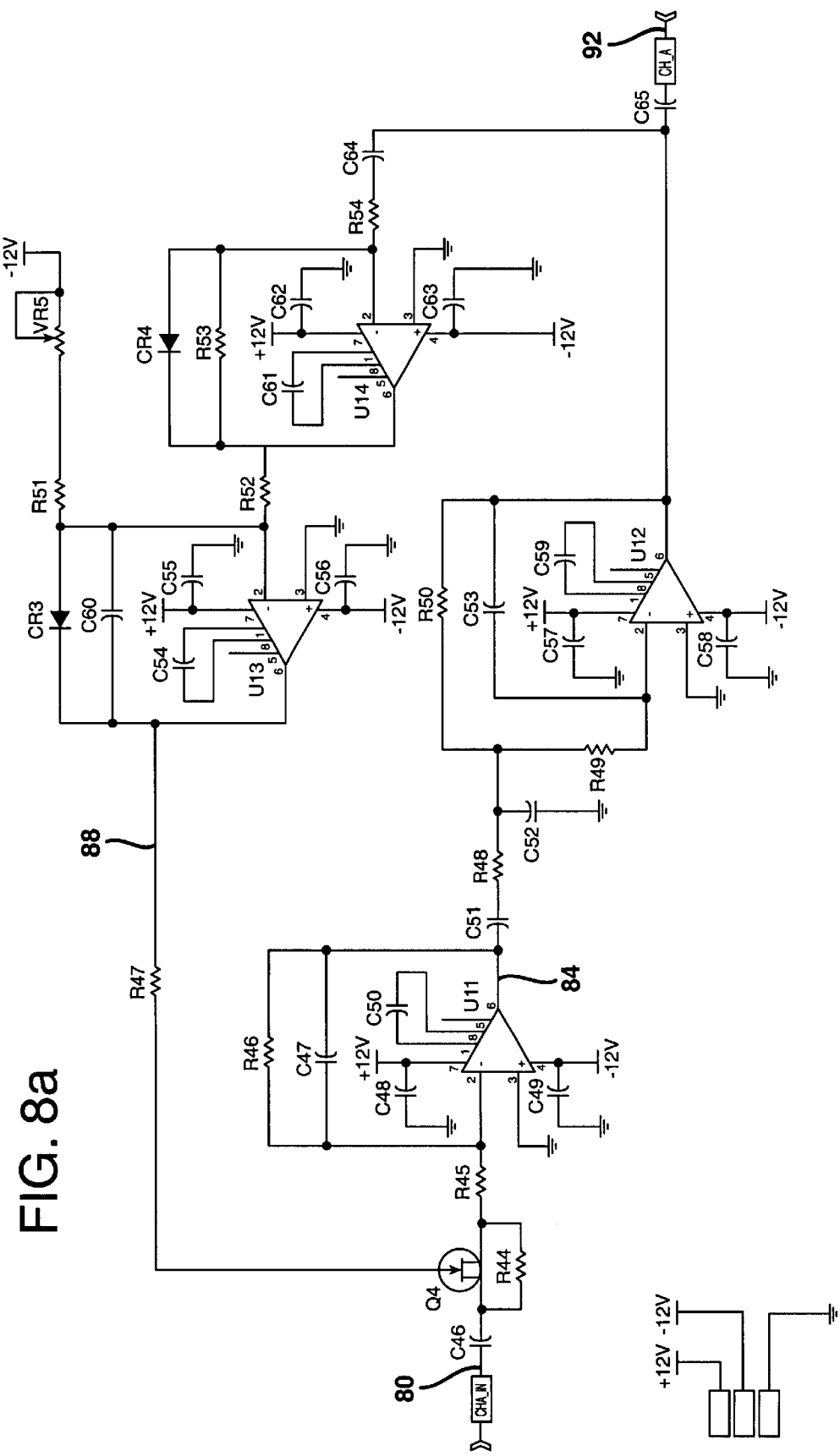
Figure 8B:
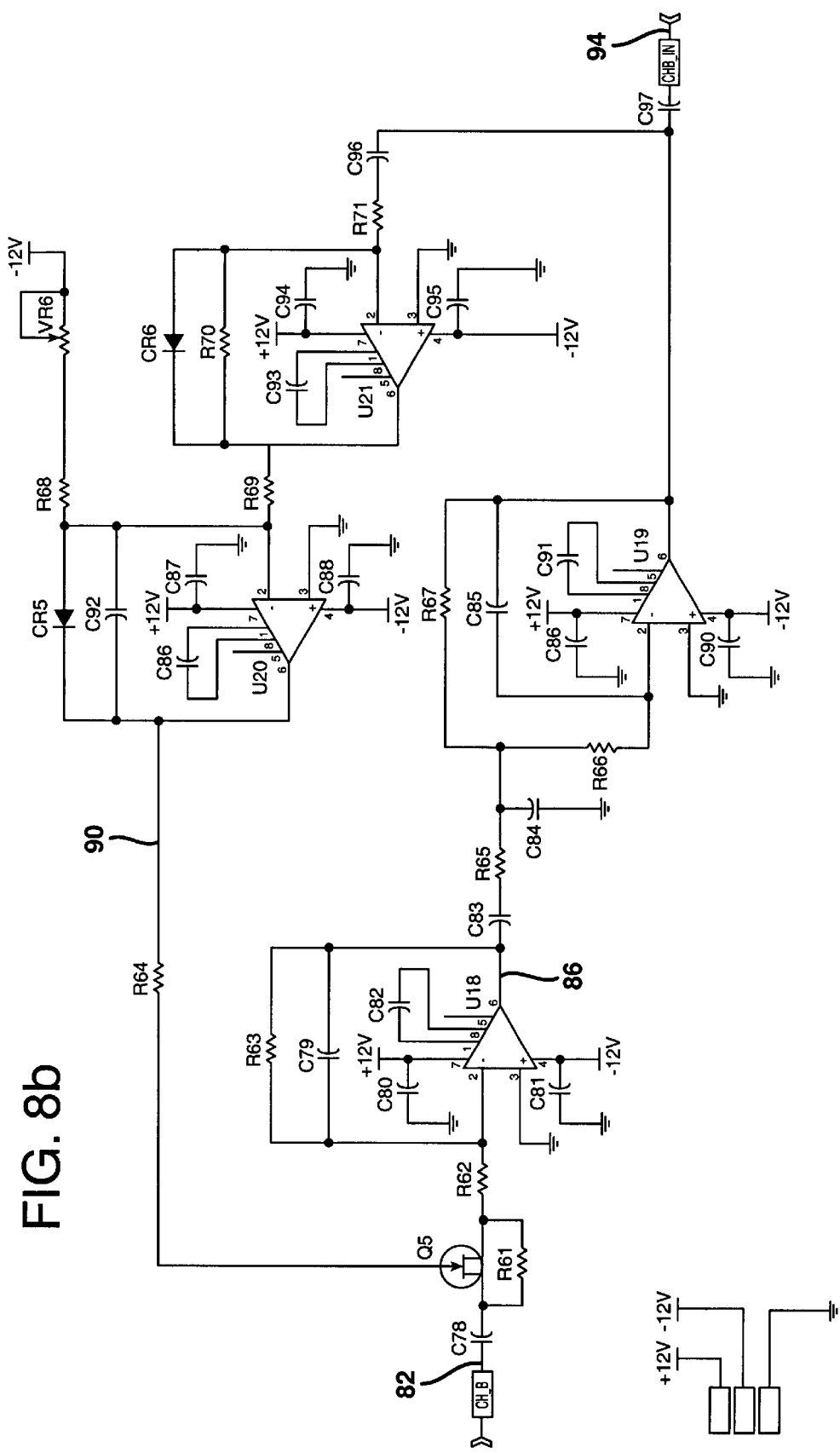
FIG. 8b is a schematic diagram of the signal controlled gain amplifier for the photodetector and preamplifier circuitry of FIG. 7b.
Figure 9:
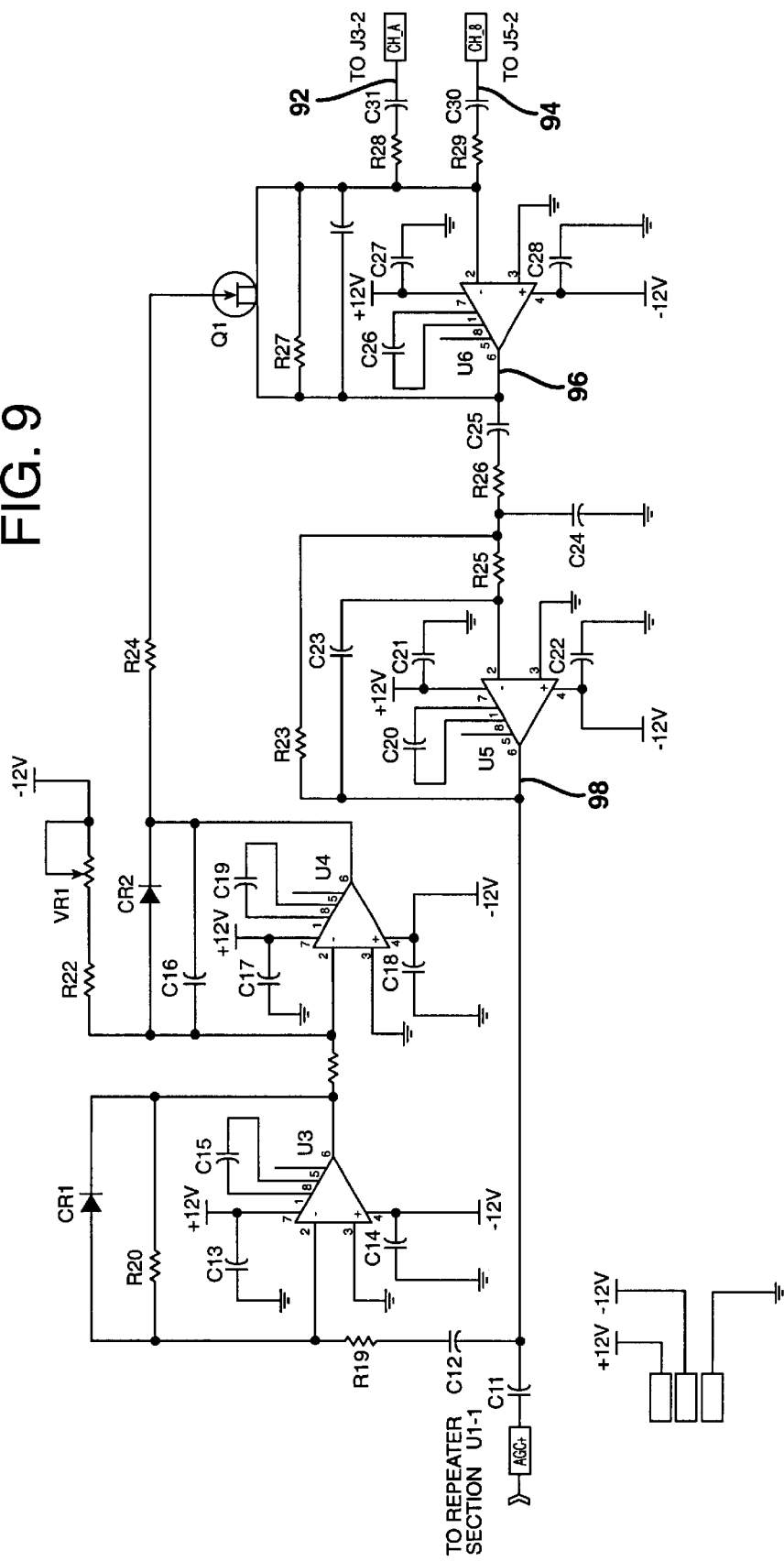
FIG. 9 is a schematic diagram of the automated gain control circuit of the invention employed in the receiver of FIG. 4.

The two signals from lines 92 and 94 of FIGS. 8a and 8b, respectively, are added in the automated gain control circuit 50, illustrated in FIG. 9, through resistors R28 and R29. These inputs are fed into an amplifier stage operational amplifier U6. The output signal from amplifier U6 on line 96 is passed through a low-pass filtering, operational amplifier U5, to clean up the noise. The output signal level on line 98 is detected by two rectifier stages formed by operational amplifiers U3 and U4. The measured signal level is used to control the impedance between the source and drain of a field-effect transistor Q1. A stronger signal level will induce a smaller impedance of the field-effect transistor Q1 to give a smaller gain of amplifier U6. This ensures that the output signal on line 98 is always a constant that is independent of the input signal level.

The level of the automatic gain control circuit output on line 98 can be controlled by adjusting the variable resistor VR1 in FIG. 9. The automatic gain control circuit 50 will eliminate any signal fluctuation caused by atmospheric effects such as turbulence, fog, smoke, dust, rain, snow, and so forth.

The values and designations of the preferred electronic circuit components shown in the schematic drawings of FIGS. 5 through 9 are set forth in Table 1 at the end of this description of the embodiment.

The digital interface for the electronics shown in FIGS. 5 through 9 may be for either DSX-1 or E1 applications. When employed for DSX-1 the system standard is a single DS-1 Bellcore TR-NWT-00499 having a line rate of 1.544 Mb/s and a line code of AMI or B8ZS. The line code is field selectible. The system employs an RJ-48C connector with a standard 100Ω balanced interface.

When employed in E-1 applications, the standard utilized is an ITU-T (CCITT G.703) having a line rate of 2.048 Mb/s and an HDB3 line code. The connector employed in this system is a BNC standard 75Ω unbalanced connector.

Undoubtedly, numerous variations and modifications of the invention will become readily apparent to those familiar with optical communication systems. Accordingly, the scope of the invention should not be construed as limited to this specific embodiment depicted and described. For example, any plural number of receiving lenses with associated photodetectors and circuitry may be employed. The greater the number of receiving links, the greater the accuracy and the reliability of the system. Naturally, however, each additional receiving lens and associated photodetector and circuitry increases the expense of the system.

TABLE 1

| Ref. Des. | Description | Manufacturer | Manufacturer Part Number |
|---|---|---|---|
| C1 | CAP, ELECTROLYTIC, RADIAL, 25 V, 100 UF, 20%, 0.1 LS | PANASONIC | ECE-A1EGE101 |
| C2 | CAP, ELECTROLYTIC, RADIAL, 25 V, 100 UF, 20%, 0.1 LS | PANASONIC | ECE-A1EGE101 |
| C3 | CAP, ELECTROLYTIC, RADIAL, 25 V, 100 UF, 20%, 0.1 LS | PANASONIC | ECE-A1EGE101 |
| C4 | CAP, POLY FILM, RADIAL, 50 V, 1.0 UF, 5%, 0.2 LS, STACKED | PANASONIC | ECQ-V1H105JZ3 |
| C5 | CAP, POLY FILM, RADIAL, 50 V, 0.1 UF, 5%, 0.2 LS, STACKED | PANASONIC | ECQ-V1H104JZ |
| C6 | CAP, ELECTROLYTIC, RADIAL, 25 V, 100 UF, 20%, 0.1 LS | PANASONIC | ECE-A1EGE101 |
| C7 | CAP, POLY FILM, RADIAL, 50 V, 0.1 UF, 5%, 0.2 LS, STACKED | PANASONIC | ECQ-V1H104JZ |
| C8 | CAP, POLY FILM, RADIAL, 50 V, 0.1 UF, 5%, 0.2 LS, STACKED | PANASONIC | ECQ-V1H104JZ |
| C9 | CAP, MONOLITHIC CERAMIC, RADIAL, 200 V, 4.7 pF, 0.5% COG, 0.1 LS | MALLORY | M15G479D2 |
| C10 | CAP, CERAMIC, RADIAL, 50 V, 15 PF, 5% COG, 0.1 LS | MURATA ERIE | RPE110COG150J50V |
| C11 | CAP, POLY FILM, RADIAL, 50 V, 0.1 UF, 5%, 0.2 LS, STACKED | PANASONIC | ECQ-V1H104JZ |
| C12 | CAP, POLY FILM, RADIAL, 50 V, 0.1 UF, 5%, 0.2 LS, STACKED | PANASONIC | ECQ-V1H104JZ |
| C13 | CAP, POLY FILM, RADIAL, 50 V, 0.1 UF, 5%, 0.2 LS, STACKED | PANASONIC | ECQ-V1H104JZ |
| C14 | CAP, POLY FILM, RADIAL, 50 V, 0.1 UF, 5%, 0.2 LS, STACKED | PANASONIC | ECQ-V1H104JZ |
| C15 | CAP, CERAMIC, RADIAL, 50 V, 15 PF, 5% COG, 0.1 LS | MURATA ERIE | RPE110COG150J50V |
| C16 | CAP, POLY FILM, RADIAL, 50 V, 0.1 UF, 5%, 0.2 LS, STACKED | PANASONIC | ECQ-V1H104JZ |
| C17 | CAP, POLY FILM, RADIAL, 50 V, 0.1 UF, 5%, 0.2 LS, STACKED | PANASONIC | ECQ-V1H104JZ |
| C18 | CAP, POLY FILM, RADIAL, 50 V, 0.1 UF, 5%, 0.2 LS, STACKED | PANASONIC | ECQ-V1H104JZ |
| C19 | CAP, CERAMIC, RADIAL, 50 V, 15 PF, 5% COG, 0.1 LS | MURATA ERIE | RPE110COG150J50V |
| C20 | CAP, CERAMIC, RADIAL, 50 V, 15 PF, 5% COG, 0.1 LS | MURATA ERIE | RPE110COG150J50V |
| C21 | CAP, POLY FILM, RADIAL, 50 V, 0.1 UF, 5%, 0.2 LS, STACKED | PANASONIC | ECQ-V1H104JZ |
| C22 | CAP, POLY FILM, RADIAL, 50 V, 0.1 UF, 5%, 0.2 LS, STACKED | PANASONIC | ECQ-V1H104JZ |
| C23 | CAP, MONOLITHIC CERAMIC, RADIAL, 50 V, 5 PF, 5% COG, 0.1 LS | MURATA ERIE | RPE110COG4R7J50V |
| C24 | CAP, MONOLITHIC CERAMIC, RADIAL, 50 V, 470 PF, 5% COG, 0.1 LS | MURATA ERIE | RPE110COG470J50V |
| C25 | CAP, POLY FILM, RADIAL, 50 V, 0.1 UF, 5%, 0.2 LS, STACKED | PANASONIC | ECQ-V1H104JZ |
| C26 | CAP, CERAMIC, RADIAL, 50 V, 15 PF, 5% COG, 0.1 LS | MURATA ERIE | RPE110COG150J50V |
| C27 | CAP, POLY FILM, RADIAL, 50 V, 0.1 UF, 5%, 0.2 LS, STACKED | PANASONIC | ECQ-V1H104JZ |
| C28 | CAP, POLY FILM, RADIAL, 50 V, 0.1 UF, 5%, 0.2 LS, STACKED | PANASONIC | ECQ-V1H104JZ |
| C29 | CAP, MONOLITHIC CERAMIC, RADIAL, 200 V, 2.2 PF, 0.5% COG, 0.1 LS | MALLORY | M15G229D2 |
| C30 | CAP, POLY FILM, RADIAL, 50 V, 0.1 UF, 5%, 0.2 LS, STACKED | PANASONIC | ECQ-V1H104JZ |
| C31 | CAP, POLY FILM, RADIAL, 50 V, 0.1 UF, 5%, 0.2 LS, STACKED | PANASONIC | ECQ-V1H104JZ |
| C32 | CAP, POLY FILM, RADIAL, 50 V, 0.1 UF, 5%, 0.2 LS, STACKED | PANASONIC | ECQ-V1H104JZ |
| C33 | CAP, ELECTROLYTIC, RADIAL, 25 V, 100 UF, 20%, 0.1 LS | PANASONIC | ECE-A1EGE101 |
| C34 | CAP, ELECTROLYTIC, RADIAL, 50 V, 22 UF, 20%, 0.1 LS | PANASONIC | ECE-A1HGE220 |
| C35 | CAP, ELECTROLYTIC, RADIAL, 50 V, 22 UF, 20%, 0.1 LS | PANASONIC | ECE-A1HGE220 |
| C36 | CAP, ELECTROLYTIC, RADIAL, 50 V, 22 UF, 20%, 0.1 LS | PANASONIC | ECE-A1HGE220 |
| C37 | CAP, ELECTROLYTIC, RADIAL, 50 V, 22 UF, 20%, 0.1 LS | PANASONIC | ECE-A1HGE220 |
| C38 | CAP, CERAMIC, RADIAL, 50 V, 15 PF, 5% COG, 0.1 LS | MURATA ERIE | RPE110COG150J50V |
| C39 | CAP, CERAMIC, RADIAL, 200 V, 2.7 pF, 0.5% COG, 0.1 LS | MALLORY | M15G279D2 |
| C40 | CAP, POLY FILM, RADIAL, 50 V, 0.01 UF, 5%, 0.2 LS, STACKED | PANASONIC | ECQ-V1H103JZ |

TABLE 1-continued

| Ref. Des. | Description | Manufacturer | Manufacturer Part Number |
|---|---|---|---|
| C41 | CAP, CERAMIC, RADIAL, 50 V, 15 PF, 5% COG, 0.1 LS | MURATA ERIE | RPE110COG150J50V |
| C42 | CAP, POLY FILM, RADIAL, 50 V, 0.1 UF, 5%, 0.2 LS, STACKED | PANASONIC | ECQ-V1H104JZ |
| C43 | CAP, POLY FILM, RADIAL, 50 V, 0.1 UF, 5%, 0.2 LS, STACKED | PANASONIC | ECQ-V1H104JZ |
| C44 | CAP, CERAMIC, RADIAL, 200 V, 2.7 pF, 0.5% COG, 0.1 LS | MALLORY | M15G279D2 |
| C45 | CAP, POLY FILM, RADIAL, 50 V, 0.1 UF, 5%, 0.2 LS, STACKED | PANASONIC | ECQ-V1H104JZ |
| C46 | CAP, POLY FILM, RADIAL, 50 V, 0.1 UF, 5%, 0.2 LS, STACKED | PANASONIC | ECQ-V1H104JZ |
| C47 | CAP, MONOLITHIC CERAMIC, RADIAL, 200 V, 2.2 pF, 0.5% COG, 0.1 LS | MALLORY | M15G229D2 |
| C48 | CAP, POLY FILM, RADIAL, 50 V, 0.1 UF, 5%, 0.2 LS, STACKED | PANASONIC | ECQ-V1H104JZ |
| C49 | CAP, POLY FILM, RADIAL, 50 V, 0.1 UF, 5%, 0.2 LS, STACKED | PANASONIC | ECQ-V1H104JZ |
| C50 | CAP, POLY FILM, RADIAL, 50 V, 0.1 UF, 5%, 0.2 LS, STACKED | PANASONIC | ECQ-V1H104JZ |
| C50 | CAP, MONOLITHIC CERAMIC, RADIAL, 50 V, 15 PF, 5% COG, 0.1 LS | MURATA ERIE | RPE110COG150J50V |
| C51 | CAP, POLY FILM, RADIAL, 50 V, 0.1 UF, 5%, 0.2 LS, STACKED | PANASONIC | ECQ-V1H104JZ |
| C52 | CAP, MONOLITHIC CERAMIC, RADIAL, 50 V, 470 PF, 5% COG, 0.1 LS | MURATA ERIE | RPE110COG470J50V |
| C53 | CAP, MONOLITHIC CERAMIC, RADIAL, 50 V, 5 PF, 5% COG, 0.1 LS | MURATA ERIE | RPE110COG4R7J50V |
| C54 | CAP, CERAMIC, RADIAL, 50 V, 15 PF, 5% COG, 0.1 LS | MURATA ERIE | RPE110COG150J50V |
| C55 | CAP, POLY FILM, RADIAL, 50 V, 0.1 UF, 5%, 0.2 LS, STACKED | PANASONIC | ECQ-V1H104JZ |
| C56 | CAP, POLY FILM, RADIAL, 50 V, 0.1 UF, 5%, 0.2 LS, STACKED | PANASONIC | ECQ-V1H104JZ |
| C57 | CAP, POLY FILM, RADIAL, 50 V, 0.1 UF, 5%, 0.2 LS, STACKED | PANASONIC | ECQ-V1H104JZ |
| C58 | CAP, POLY FILM, RADIAL, 50 V, 0.1 UF, 5%, 0.2 LS, STACKED | PANASONIC | ECQ-V1H104JZ |
| C59 | CAP, CERAMIC, RADIAL, 50 V, 15 PF, 5% COG, 0.1 LS | MURATA ERIE | RPE110COG150J50V |
| C60 | CAP, POLY FILM, RADIAL, 50 V, 0.1 UF, 5%, 0.2 LS, STACKED | PANASONIC | ECQ-V1H104JZ |
| C61 | CAP, CERAMIC, RADIAL, 50 V, 15 PF, 5% COG, 0.1 LS | MURATA ERIE | RPE110COG150J50V |
| C62 | CAP, POLY FILM, RADIAL, 50 V, 0.1 UF, 5%, 0.2 LS, STACKED | PANASONIC | ECQ-V1H104JZ |
| C63 | CAP, POLY FILM, RADIAL, 50 V, 0.1 UF, 5%, 0.2 LS, STACKED | PANASONIC | ECQ-V1H104JZ |
| C64 | CAP, POLY FILM, RADIAL, 50 V, 0.1 UF, 5%, 0.2 LS, STACKED | PANASONIC | ECQ-V1H104JZ |
| C65 | CAP, POLY FILM, RADIAL, 50 V, 0.1 UF, 5%, 0.2 LS, STACKED | PANASONIC | ECQ-V1H104JZ |
| C66 | CAP, ELECTROLYTIC, RADIAL, 50 V, 22 UF, 20%, 0.1 LS | PANASONIC | ECE-A1HGE220 |
| C67 | CAP, ELECTROLYTIC, RADIAL, 50 V, 22 UF, 20%, 0.1 LS | PANASONIC | ECE-A1HGE220 |
| C68 | CAP, ELECTROLYTIC, RADIAL, 50 V, 22 UF, 20%, 0.1 LS | PANASONIC | ECE-A1HGE220 |
| C69 | CAP, ELECTROLYTIC, RADIAL, 50 V, 22 UF, 20%, 0.1 LS | PANASONIC | ECE-A1HGE220 |
| C70 | CAP, ELECTROLYTIC, RADIAL, 50 V, 22 UF, 20%, 0.1 LS | PANASONIC | ECE-A1HGE220 |
| C70 | CAP, CERAMIC, RADIAL, 50 V, 15 PF, 5% COG, 0.1 LS | MURATA ERIE | RPE110COG150J50V |
| C71 | CAP, CERAMIC, RADIAL, 200 V, 2.7 pF, 0.5% COG, 0.1 LS | MALLORY | M15G279D2 |
| C72 | CAP, POLY FILM, RADIAL, 50 V, 0.01 UF, 5%, 0.2 LS, STACKED | PANASONIC | ECQ-V1H103JZ |
| C73 | CAP, CERAMIC, RADIAL, 50 V, 15 PF, 5% COG, 0.1 LS | MURATA ERIE | RPE110COG150J50V |
| C74 | CAP, POLY FILM, RADIAL, 50 V, 0.1 UF, 5%, 0.2 LS, STACKED | PANASONIC | ECQ-V1H104JZ |
| C75 | CAP, POLY FILM, RADIAL, 50 V, 0.1 UF, 5%, 0.2 LS, STACKED | PANASONIC | ECQ-V1H104JZ |
| C76 | CAP, CERAMIC, RADIAL, 200 V, 2.7 pF, 0.5% COG, 0.1 LS | MALLORY | M15G279D2 |
| C77 | CAP, POLY FILM, RADIAL, 50 V, 0.1 UF, 5%, 0.2 LS, STACKED | PANASONIC | ECQ-V1H104JZ |
| C78 | CAP, POLY FILM, RADIAL, 50 V, 0.1 UF, 5%, 0.2 LS, STACKED | PANASONIC | ECQ-V1H104JZ |
| C79 | CAP, MONOLITHIC CERAMIC, RADIAL, 200 V, 2.2 pF, 0.5% COG, 0.1 LS | MALLORY | M15G229D2 |
| C80 | CAP, POLY FILM, RADIAL, 50 V, 0.1 UF, 5%, 0.2 LS, STACKED | PANASONIC | ECQ-V1H104JZ |
| C81 | CAP, POLY FILM, RADIAL, 50 V, 0.1 UF, 5%, 0.2 LS, STACKED | PANASONIC | ECQ-V1H104JZ |
| C82 | CAP, CERAMIC, RADIAL, 50 V, 15 PF, 5% COG, 0.1 LS | MURATA ERIE | RPE110COG150J50V |
| C83 | CAP, POLY FILM, RADIAL, 50 V, 0.1 UF, 5%, 0.2 LS, STACKED | PANASONIC | ECQ-V1H104JZ |
| C84 | CAP, MONOLITHIC CERAMIC, RADIAL, 50 V, 470 PF, 5% COG, 0.1 LS | MURATA ERIE | RPE110C0G470J50V |
| C85 | CAP, MONOLITHIC CERAMIC, RADIAL, 50 V, 5 PF, 5% COG, 0.1 LS | MURATA ERIE | RPE110COG4R7J50V |
| C86 | CAP, CERAMIC, RADIAL, 50 V, 15 PF, 5% COG, 0.1 LS | MURATA ERIE | RPE110COG150J50V |

TABLE 1-continued

| Ref. Des. | Description | Manufacturer | Manufacturer Part Number |
|---|---|---|---|
| C87 | CAP, POLY FILM, RADIAL, 50 V, 0.1 UF, 5%, 0.2 LS, STACKED | PANASONIC | ECQ-V1H104JZ |
| C88 | CAP, POLY FILM, RADIAL, 50 V, 0.1 UF, 5%, 0.2 LS, STACKED | PANASONIC | ECQ-V1H104JZ |
| C89 | CAP, POLY FILM, RADIAL, 50 V, 0.1 UF, 5%, 0.2 LS, STACKED | PANASONIC | ECQ-V1H104JZ |
| C90 | CAP, POLY FILM, RADIAL, 50 V, 0.1 UF, 5%, 0.2 LS, STACKED | PANASONIC | ECQ-V1H104JZ |
| C91 | CAP, CERAMIC, RADIAL, 50 V, 15 PF, 5% COG, 0.1 LS | MURATA ERIE | RPE110COG150J50V |
| C92 | CAP, POLY FILM, RADIAL, 50 V, 0.1 UF, 5%, 0.2 LS, STACKED | PANASONIC | ECQ-V1H104JZ |
| C93 | CAP, CERAMIC, RADIAL, 50 V, 15 PF, 5% COG, 0.1 LS | MURATA ERIE | RPE110COG150J50V |
| C94 | CAP, POLY FILM, RADIAL, 50 V, 0.1 UF, 5%, 0.2 LS, STACKED | PANASONIC | ECQ-V1H104JZ |
| C95 | CAP, POLY FILM, RADIAL, 50 V, 0.1 UF, 5%, 0.2 LS, STACKED | PANASONIC | ECQ-V1H104JZ |
| C96 | CAP, POLY FILM, RADIAL, 50 V, 0.1 UF, 5%, 0.2 LS, STACKED | PANASONIC | ECQ-V1H104JZ |
| C97 | CAP, POLY FILM, RADIAL, 50 V, 0.1 UF, 5%, 0.2 LS, STACKED | PANASONIC | ECQ-V1H104JZ |
| CR1 | SEMIC, DIODE, HIGH SPEED RECT., 100 PIV, DO-35 | DIODES INC. | 1N4148 |
| CR2 | SEMIC, DIODE, HIGH SPEED RECT., 100 PIV, DO-35 | DIODES INC. | 1N4148 |
| CR3 | SEMIC, DIODE, HIGH SPEED RECT., 100 PIV, DO-35 | DIODES INC. | 1N4148 |
| CR4 | SEMIC, DIODE, HIGH SPEED RECT., 100 PIV, DO-35 | DIODES INC. | 1N4148 |
| CR5 | SEMIC, DIODE, HIGH SPEED RECT., 100 PIV, DO-35 | DIODES INC. | 1N4148 |
| CR6 | SEMIC, DIODE, HIGH SPEED RECT., 100 PIV, DO-35 | DIODES INC. | 1N4148 |
| J1 | CONN., RJ48C, CENT. LATCH, 8 POS., W/PNL. STOPS, RA, PCB MT. | AMP | 5202514 |
| J2 | CONNECTOR, CIRCULAR, DIN, 5 SOCKET, RA, PCB MT. | CUISTACK | CP-2350 |
| J3 | HEADER STICK, .025 SQ/.230 L POST, 2X36, GOLD | SULLINS | PZC36DAAN |
| J4 | HEADER STICK, .025 SQ/.230 L POST, 2X36, GOLD | SULLINS | PZC36DAAN |
| J5 | HEADER STICK, .025 SQ/.230 L POST, 2X36, GOLD | SULLINS | PZC36DAAN |
| J6 | HEADER STICK, .025 SQ/.230 L POST, 2X36, GOLD | SULLINS | PZC36DAAN |
| J7 | HEADER STICK, .025 SQ/.230 L POST, 2X36, GOLD | SULLINS | PZC36DAAN |
| J8 | HEADER STICK, .025 SQ/.230 L POST, 2X36, GOLD | SULLINS | PZC36DAAN |
| LD1 | SEMIC, LASER DIODE, 780 nm, | SHARP | LT022MC |
| P1 | CONN, MULTIPIN MOLDED, DBL ROW, MINI LATCH HOUSING, 8 POS | BERG | 65043-033 |
| P2 | CONN, MULTIPIN MOLDED, DBL ROW, MINI LATCH HOUSING, 8 POS | BERG | 65043-033 |
| P3 | CONN, MULTIPIN MOLDED, DBL ROW, MINI LATCH HOUSING, 6 POS | BERG | 65043-034 |
| P4 | CONN, MULTIPIN MOLDED, DBL ROW, MINI LATCH HOUSING, 6 POS | BERG | 65043-034 |
| P5 | CONN, MULTIPIN MOLDED, DBL ROW, MINI LATCH HOUSING, 8 POS | BERG | 65043-033 |
| P6 | CONN, MULTIPIN MOLDED, DBL ROW, MINI LATCH HOUSING, 8 POS | BERG | 65043-033 |
| Q1 | SEMIC, TRANSISTOR, JFET, P-CHANNEL, TO-92 | NATIONAL | 2N5460 |
| Q2 | SEMIC, TRANSISTOR, NPN, | | 25C752 |
| Q3 | SEMIC, TRANSISTOR, NPN, | 25C752 | |
| Q4 | SEMIC, TRANSISTOR, JFET, P-CHANNEL, TO-92 | NATIONAL | 2N5460 |
| Q5 | SEMIC, TRANSISTOR, JFET, P-CHANNEL, TO-92 | NATIONAL | 2N5460 |
| R1 | RES, METAL OXIDE FILM, 1 W, 5.6 OHM, 5% | YAGEO | 5.6W-1 |
| R2 | RES, METAL OXIDE FILM, 1 W, 5.6 OHM, 5% | YAGEO | 5.6W-1 |
| R3 | RES, METAL FILM, RN55, ¼ W, 33.2 OHM, 1% | YAGEO | 33.2X |
| R4 | RES, METAL FILM, RN55, ¼ W, 33.2 OHM, 1% | YAGEO | 33.2X |
| R5 | RES, METAL FILM, RN55, ¼ W, 60.4 OHM, 1% | YAGEO | 60.4X |
| R6 | RES, METAL FILM, RN55, ¼ W, 10.0K, 1% | YAGEO | 10.0KX |
| R7 | RES, METAL FILM, RN55, ¼ W, 499 OHM 1% | YAGEO | 499KX |
| R8 | RES, METAL FILM, RN55, ¼ W, 10.0K, 1% | YAGEO | 10.0KX |
| R9 | RES, METAL FILM, RN55, ¼ W, 10.0K, 1% | YAGEO | 10.0KX |
| R10 | RES, METAL FILM, RN55, ¼ W, 499 OHM 1% | YAGEO | 499KX |
| R11 | RES, METAL FILM, RN55, ¼ W, 511 OHM, 1% | YAGEO | 511X |

TABLE 1-continued

| Ref. Des. | Description | Manufacturer | Manufacturer Part Number |
|---|---|---|---|
| R12 | RES, METAL FILM, RN55, ¼ W, 100 OHM, 1% | YAGEO | 100X |
| R13 | RES, METAL FILM, RN55, ¼ W, 100 OHM, 1% | YAGEO | 100X |
| R14 | RES, METAL FILM, RN55, ¼ W, 100 OHM, 1% | YAGEO | 100X |
| R15 | RES, METAL FILM, RN55, ¼ W, 1.00K, 1% | YAGEO | 1.00KX |
| R16 | RES, METAL FILM, RN55, ¼ W, 10.0K, 1% | YAGEO | 10.0KX |
| R17 | RES, METAL OXIDE FILM, 1 W, 5.6 OHM, 5% | YAGEO | 5.6W-1 |
| R18 | RES, METAL OXIDE FILM, 1 W, 5.6 OHM, 5% | YAGEO | 5.6W-1 |
| R19 | RES, METAL FILM, RN55, ¼ W, 10.0K, 1% | YAGEO | 10.0KX |
| R20 | RES, METAL FILM, RN55, ¼ W, 10.0K, 1% | YAGEO | 10.0KX |
| R21 | RES, METAL FILM, RN55, ¼ W, 2.80K, 1% | YAGEO | 2.80KX |
| R22 | RES, METAL FILM, RN55, ¼ W, 301K, 1% | YAGEO | 301KX |
| R23 | RES, METAL FILM, RN55, ¼ W, 2.0K, 1% | YAGEO | 2.0KX |
| R24 | RES, METAL FILM, RN55, ¼ W, 100K, 1% | YAGEO | 100KX |
| R25 | RES, METAL FILM, RN55, ¼ W, 2.0K, 1% | YAGEO | 2.0KX |
| R26 | RES, METAL FILM, RN55, ¼ W, 200 OHM, 1% | YAGEO | 200X |
| R27 | RES, METAL FILM, RN55, ¼ W, 100K, 1% | YAGEO | 100KX |
| R28 | RES, METAL FILM, RN55, ¼ W, 10.0K, 1% | YAGEO | 10.0KX |
| R29 | RES, METAL FILM, RN55, ¼ W, 10.0K, 1% | YAGEO | 10.0KX |
| R31 | RES, METAL FILM, RN55, ¼ W, 100 OHM, 1% | YAGEO | 100X |
| R32 | RES, METAL FILM, RN55, ¼ W, 75 OHM, 1% | YAGEO | 75X |
| R33 | RES, METAL FILM, RN55, ¼ W, 51.1 OHM, 1% | YAGEO | 51.1X |
| R35 | RES, METAL FILM, RN55, ¼ W, 549 OHM, 1% | YAGEO | 549X |
| R36 | RES, METAL FILM, RN55, ¼ W, 20 OHM, 1% | YAGEO | 20X |
| R37 | RES, METAL FILM, RN55, ¼ W, 15 OHM, 1% | YAGEO | 15X |
| R38 | RES, METAL FILM, RN55, ¼ W, 2.80K, 1% | YAGEO | 2.80KX |
| R39 | RES, METAL FILM, RN55, ¼ W, 2.80K, 1% | YAGEO | 2.80KX |
| R40 | RES, METAL FILM, RN55, ¼ W, 51.1K, 1% | YAGEO | 51.1KX |
| R41 | RES, METAL FILM, RN55, ¼ W, 1.00K, 1% | YAGEO | 1.00KX |
| R42 | RES, METAL FILM, RN55, ¼ W, 49.9K, 1% | YAGEO | 49.9KX |
| R43 | RES, METAL FILM, RN55, ¼ W, 100K, 1% | YAGEO | 100KX |
| R44 | RES, METAL FILM, RN55, ¼ W, 100K, 1% | YAGEO | 100KX |
| R45 | RES, METAL FILM, RN55, ¼ W, 10.0K, 1% | YAGEO | 10.0KX |
| R46 | RES, METAL FILM, RN55, ¼ W, 100K, 1% | YAGEO | 100KX |
| R47 | RES, METAL FILM, RN55, ¼ W, 100K, 1% | YAGEO | 100KX |
| R48 | RES, METAL FILM, RN55, ¼ W, 200 OHM, 1% | YAGEO | 200X |
| R49 | RES, METAL FILM, RN55, ¼ W, 2.0K, 1% | YAGEO | 2.0KX |
| R50 | RES, METAL FILM, RN55, ¼ W, 2.0K, 1% | YAGEO | 2.0KX |
| R51 | RES, METAL FILM, RN55, ¼ W, 301K, 1% | YAGEO | 301KX |
| R52 | RES, METAL FILM, RN55, ¼ W, 2.80K, 1% | YAGEO | 2.80KX |
| R53 | RES, METAL FILM, RN55, ¼ W, 10.0K, 1% | YAGEO | 10.0KX |
| R54 | RES, METAL FILM, RN55, ¼ W, 10.0K, 1% | YAGEO | 10.0KX |
| R55 | RES, METAL FILM, RN55, ¼ W, 2.80K, 1% | YAGEO | 2.80KX |
| R56 | RES, METAL FILM, RN55, ¼ W, 2.80K, 1% | YAGEO | 2.80KX |
| R57 | RES, METAL FILM, RN55, ¼ W, 51.1K, 1% | YAGEO | 51.1KX |
| R58 | RES, METAL FILM, RN55, ¼ W, 1.00K, 1% | YAGEO | 1.00KX |
| R59 | RES, METAL FILM, RN55, ¼ W, 49.9K, 1% | YAGEO | 49.9KX |
| R60 | RES, METAL FILM, RN55, ¼ W, 100K, 1% | YAGEO | 100KX |
| R61 | RES, METAL FILM, RN55, ¼ W, 100K, 1% | YAGEO | 100KX |
| R62 | RES, METAL FILM, RN55, ¼ W, 10.0K, 1% | YAGEO | 10.0KX |
| R63 | RES, METAL FILM, RN55, ¼ W, 100K, 1% | YAGEO | 100KX |

TABLE 1-continued

| Ref. Des. | Description | Manufacturer | Manufacturer Part Number |
|---|---|---|---|
| R64 | RES, METAL FILM, RN55, ¼ W, 100K, 1% | YAGEO | 100KX |
| R65 | RES, METAL FILM, RN55, ¼ W, 200 OHM, 1% | YAGEO | 200X |
| R66 | RES, METAL FILM, RN55, ¼ W, 2.0K, 1% | YAGEO | 2.0KX |
| R67 | RES, METAL FILM, RN55, ¼ W, 2.0K, 1% | YAGEO | 2.0KX |
| R68 | RES, METAL FILM, RN55, ¼ W, 301K, 1% | YAGEO | 301KX |
| R69 | RES, METAL FILM, RN55, ¼ W, 2.80K, 1% | YAGEO | 2.80KX |
| R70 | RES, METAL FILM, RN55, ¼ W, 10.0K, 1% | YAGEO | 10.0KX |
| R71 | RES, METAL FILM, RN55, ¼ W, 10.0K, 1% | YAGEO | 10.0KX |
| T1 | MISC, OTHER, INDUCTOR, T1 CARRIER TRANSMIT | SCHOTT | 67125350 |
| T2 | MISC, OTHER, INDUCTOR, 1.544 MHz T1 | SCHOTT | 67109510 |
| U1 | IC, ANALOG, T1 PCM REPEATER/TRANS-CEIVER | LEVEL ONE | LXT312 |
| U2 | IC, OP AMP, HIGH SPEED, DIP8 | NATIONAL | LM318N |
| U3 | IC, OP AMP, HIGH SPEED, DIP8 | NATIONAL | LM318N |
| U4 | IC, OP AMP, HIGH SPEED, DIP8 | NATIONAL | LM318N |
| U5 | IC, OP AMP, HIGH SPEED, DIP8 | NATIONAL | LM318N |
| U6 | IC, OP AMP, HIGH SPEED, DIP8 | NATIONAL | LM318N |
| U7 | IC, ANALOG, LASER DIODE DRIVER, DIP8 | SHARP | IR3C01 |
| U8 | IC, OP AMP, HIGH SPEED, DIP8 | NATIONAL | LM318N |
| U9 | IC, OP AMP, HIGH SPEED, DIP8 | NATIONAL | LM318N |
| U10 | PIN PHOTODIODE, TO-18 | HEWLETT PACKARD | HP5082-4207 |
| U11 | IC, OP AMP, HIGH SPEED, DIP8 | NATIONAL | LM318N |
| U12 | IC, OP AMP, HIGH SPEED, DIP8 | NATIONAL | LM318N |
| U13 | IC, OP AMP, HIGH SPEED, DIP8 | NATIONAL | LM318N |
| U14 | IC, OP AMP, HIGH SPEED, DIP8 | NATIONAL | LM318N |
| U15 | IC, OP AMP, HIGH SPEED, DIP8 | NATIONAL | LM318N |
| U16 | IC, OP AMP, HIGH SPEED, DIP8 | NATIONAL | LM318N |
| U17 | PIN PHOTODIODE, TO-18 | HEWLETT PACKARD | HP5082-4207 |
| U18 | IC, OP AMP, HIGH SPEED, DIP8 | NATIONAL | LM318N |
| U19 | IC, OP AMP, HIGH SPEED, DIP8 | NATIONAL | LM318N |
| U20 | IC, OP AMP, HIGH SPEED, DIP8 | NATIONAL | LM318N |
| U21 | IC, OP AMP, HIGH SPEED, DIP8 | NATIONAL | LM318N |
| VR1 | RES, TRIMPOT, ⅜ SQ., ½ W, 1.0M, 10%, TOP ADJ, 25 TURN | BOURNS | 3299W-105 |
| VR2 | RES, TRIMPOT, ⅜ SQ., ½ W, 100K, 10%, TOP ADJ, 25 TURN | BOURNS | 3299W-104 |
| VR3 | RES, TRIMPOT, ⅜ SQ., ½ W, 500 OHM, 10%, TOP ADJ, 25 TURN | BOURNS | 3299W-501 |
| VR4 | RES, TRIMPOT, ⅜ SQ., ½ W, 50K, 10%, TOP ADJ, 25 TURN | BOURNS | 3299W-503 |
| VR5 | RES, TRIMPOT, ⅜ SQ., ½ W, 1.0M, 10%, TOP ADJ, 25 TURN | BOURNS | 3299W-105 |
| VR6 | RES, TRIMPOT, ⅜ SQ., ½ W, 1.0M, 10%, TOP ADJ, 25 TURN | BOURNS | 3299W-105 |
| W1 | CONN, HEADER STICK, .025 SQ/.230 L POST, 1X36, GOLD | SULLINS | PZC36SAAN |
| W2 | CONN, HEADER STICK, .025 SQ/.230 L POST, 1X36, GOLD | SULLINS | PZC36SAAN |
| W3 | CONN, HEADER STICK, .025 SQ/.230 L POST, 1X36, GOLD | SULLINS | PZC36SAAN |
| W4 | CONN, HEADER STICK, .025 SQ/.230 L POST, 1X36, GOLD | SULLINS | PZC36SAAN |
| XI | CRYSTAL, 6.176 MHz (T1) | US CRYSTAL | U49-18-6176SP |

What is claimed is:

1. An atmospheric turbulence resistant optical communication system comprising:

a transmitter that includes a waveform shaping modulator, an optical source, and beam forming optics for producing a collimated optical beam, a receiver located in a line-of-sight path with said optical beam and including a plural number of focusing receiving lenses of equal diameter spaced apart in a plane normal to said optical beam a distance greater than said receiving lens diameter, a separate photodetector for each of said receiving lenses, and separate signal controlled gain amplifiers for each of said photodetectors, and an automatic gain control circuit coupled to receive and combine inputs from all of said signal controlled gain amplifiers and conditioned to provide a combined output signal of constant level.

2. An optical communication system according to claim 1 wherein said receiver is comprised of only a pair of receiving lenses, photodetectors, and signal controlled gain amplifiers.

3. An optical communication system according to claim 1 wherein said signal controlled gain amplifiers detect the signal-to-noise ratio from their respective photodetectors and said automatic gain control circuit provides said combined output with a contribution from each photodetector weighted in accordance with the signal-to-noise ratio thereof.

4. An optical communication system according to claim 1 further comprising threshold detection circuitry for each of said photodetectors to establish a minimum threshold for signals from each of said photodetectors.

5. An optical communication system according to claim 1 wherein said optical source in said transmitter is a laser diode.

6. An optical communication system according to claim 1 wherein said photodetectors are all noncoherent receivers.

7. An optical communication system according to claim 1 wherein said receiver further includes filters in front of said receiving lenses to reduce the effects of background radiation.

8. An optical communication system according to claim 1 wherein said optical source is a laser diode and said beam forming optics in said transmitter include a collimating lens having a diameter of about one inch focused on said laser diode, and each of said receiving lenses is about two inches in diameter and is focused on said photodetector therefor.

9. An optical communication system according to claim 8 wherein said collimating lens produces said collimated optical beam with an elliptical cross section, the major axis of which is vertically oriented, and said receiving lenses are spaced from each other in a horizontal direction.

10. An optical communication system according to claim 1 wherein said signal controlled gain amplifiers amplify outputs from their respective photodetectors with a gain that is proportional to the signal-to-noise ratio thereof, so that said combined output signal is weighted greatest by the photodetector having the greatest signal-to-noise ratio.

11. An open-air optical communication system that minimizes distortions due to atmospheric attenuation and scattering comprising:
an optical transmitter that generates a collimated optical beam from a modulated light source,
an optical receiver including a plurality of receiving lenses of equal diameter and focal lengths all located in optical communication with said optical transmitter and in the path of said optical beam and separated from each in a direction perpendicular to said optical beam by a distance at least as great as said receiving lens diameter, a separate optical photodetector producing an electronic output for each of said receiving lenses, a separate signal controlled gain amplifier circuit coupled to each of said optical photodetectors for detecting the signal-to-noise ratio of said electronic output therefrom, and an automated gain control stage that receives inputs from all of said signal controlled gain amplifier circuits and which produces a combined electronic output signal weighted in accordance with the signal-to-noise ratios of said signal controlled gain amplifier circuits.

12. An optical communication system according to claim 11 further comprising a threshold detection circuit for each of said photodetectors to ensure at least a minimum signal strength for each of said signal controlled gain amplifier circuits in order to provide an input therefrom to said automated gain control stage.

13. An optical communication system according to claim 11 wherein said optical receiver is comprised of only a pair of receiving lenses, each about two inches in diameter, and said optical transmitter employs a single transmitting lens that has a diameter of about one inch.

14. An optical communication system according to claim 13 wherein said transmitting lens emits a collimated beam having an elliptical cross section with a major axis oriented in a vertical direction and said receiving lenses are spaced from each other in a horizontal direction.

15. In an open-air optical communication system employing a transmitter that generates a collimated optical beam modulated by a communication signal and a receiver disposed in optical communication with said collimated optical signal beam to detect and demodulate said collimated optical beam to extract said communication signal therefrom, the improvement wherein said receiver is comprised of a plurality of receiving lenses of equal diameter that all lie in said optical path of said collimated optical beam and which are separated from each other in a plane normal to said optical path by a distance at least as great as said receiving lens diameter, a separate photodetector for each of said receiving lenses to independently detect said collimated optical beam therethrough, separate gain amplifiers for each of said photodetectors, and a common automatic gain-controlled circuit coupled to receive inputs from all of said separate gain amplifiers and to combine said inputs to produce a single demodulated output communication signal having a constant level.

16. An optical communication signal according to claim 15 wherein said transmitter includes a single laser diode and a single transmitting lens focused on said laser diode, and said receiver includes only a pair of said receiving lenses, each focused on a separate noncoherent receiver photodetector.

17. An optical communication system according to claim 16 wherein said single transmitting lens and said collimated beam has an elliptical cross section with a vertically oriented major axis and said pair of receiver lenses are spaced horizontally from each other.

* * * * *